(12) United States Patent
Kawai et al.

(10) Patent No.: US 7,619,030 B2
(45) Date of Patent: Nov. 17, 2009

(54) AUTOMOBILE PART OF POLYPROPYLENE RESIN COMPOSITION

(75) Inventors: Koji Kawai, Sodegaura (JP); Masahiro Yamashita, Sodegaura (JP); Yasushi Tohi, Sodegaura (JP); Keita Itakura, Sodegaura (JP); Ikunori Sakai, Sodegaura (JP); Mikio Hashimoto, Sodegaura (JP); Takeshi Minoda, Sodegaura (JP); Masamichi Naito, Sodegaura (JP); Toru Takaoka, Sodegaura (JP); Nobuo Kawahara, Sodegaura (JP); Hiromu Kaneyoshi, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 189 days.

(21) Appl. No.: 11/411,093

(22) Filed: Apr. 26, 2006

(65) Prior Publication Data

US 2006/0194914 A1   Aug. 31, 2006

Related U.S. Application Data

(63) Continuation of application No. 10/275,903, filed as application No. PCT/JP02/02186 on Mar. 8, 2002, now Pat. No. 7,081,493.

(30) Foreign Application Priority Data

Mar. 15, 2001 (JP) ............... 2001-074880
Mar. 15, 2001 (JP) ............... 2001-074884

(51) Int. Cl.
*B01F 17/00* (2006.01)
*C08F 8/00* (2006.01)
*C08G 18/42* (2006.01)
*C08J 3/00* (2006.01)
*C08J 3/22* (2006.01)
*C08K 3/00* (2006.01)
*C08L 23/00* (2006.01)
*C08L 23/04* (2006.01)
*C08L 53/00* (2006.01)
*C09J 7/02* (2006.01)

(52) U.S. Cl. ............... 524/505; 296/901.01; 524/500; 524/528; 524/451; 525/55; 525/191; 525/240

(58) Field of Classification Search ............... 524/500, 524/505, 528, 451; 296/901.01; 525/55, 525/191, 240

See application file for complete search history.

(56) References Cited

U.S. PATENT DOCUMENTS 3,265,765 A   8/1966   Holden

| | | |
|---|---|---|
| 3,333,024 A | 7/1967 | Haefele |
| 5,484,824 A | 1/1996 | Abe et al. |
| 5,591,795 A | 1/1997 | Nomura et al. |
| 5,750,612 A | 5/1998 | Zyagawa et al. |
| 5,760,141 A | 6/1998 | Watanabe et al. |
| 5,856,400 A | 1/1999 | Matsumura et al. |
| 5,874,505 A | 2/1999 | Saito et al. |
| 6,156,836 A | 12/2000 | Iwanami et al. |
| 6,169,144 B1 | 1/2001 | Higashi et al. |
| 6,306,972 B1 | 10/2001 | Ohkawa et al. |
| 6,441,075 B2 | 8/2002 | Hirata et al. |
| 6,660,797 B1 | 12/2003 | Banno et al. |
| 6,730,728 B2 | 5/2004 | Matsuda et al. |
| 6,759,475 B2 | 7/2004 | Sakai et al. |
| 6,777,497 B2 | 8/2004 | Kanzaki et al. |
| 2002/0058741 A1* | 5/2002 | Sakai et al. ............... 524/451 |
| 2002/0176974 A1 | 11/2002 | Hanyu et al. |
| 2003/0055172 A1* | 3/2003 | Kanzaki et al. ............ 525/240 |
| 2004/0014871 A1 | 1/2004 | Zanka et al. |

FOREIGN PATENT DOCUMENTS

| | | |
|---|---|---|
| DE | 19927477 A1 | 12/1999 |
| EP | 1 095 951 A1 | 5/2001 |
| JP | 40-23798 B | 10/1965 |
| JP | 42-8704 B | 4/1967 |
| JP | 43-6636 B | 3/1968 |
| JP | 42-20814 B | 6/1971 |
| JP | 46-20814 B | 6/1971 |
| JP | 62-265314 A | 11/1987 |
| JP | 9-124736 A | 5/1997 |
| JP | 9-165479 A | 6/1997 |
| JP | 10-001573 A | 1/1998 |
| JP | 10-212311 A | 8/1998 |
| JP | 11-171925 A | 6/1999 |
| JP | 11-228759 A | 8/1999 |
| JP | 11-302471 A | 11/1999 |
| WO | WO99/67303 A1 | 12/1999 |

OTHER PUBLICATIONS

Supplementary European Search Report issued in EP 02 70 3946.
Walter Spaleck, et al., "The Influence of Aromatic Substituents on the Polymerization Behavior of Bridged Zirconocene Catalysts", Organometallics, 1994, vol. 13, pp. 954-963.

* cited by examiner

*Primary Examiner*—Patrick D Niland
(74) *Attorney, Agent, or Firm*—Buchanan Ingersoll & Rooney PC

(57) ABSTRACT

An automobile part comprising a polypropylene resin composition, the polypropylene resin composition comprising a propylene homopolymer (A1), an elastomer (B) and an inorganic filler (C) in specified proportions. The polypropylene homopolymer (A1) exhibits an MFR (230° C.) of 20 to 300 g/10 min, a ratio of position irregular units derived from 2,1-insertion or 1,3-insertion of propylene monomer relative to all propylene structural units, determined from a $^{13}$C-NMR spectrum, each of 0.05% or less, and an Mw/Mn, determined by GPC, of 1 to 3.

3 Claims, No Drawings

AUTOMOBILE PART OF POLYPROPYLENE RESIN COMPOSITION

CROSS REFERENCE TO RELATED APPLICATIONS

This application is a continuation of application Ser. No. 10/275,903, filed Nov. 12, 2002, now U.S. Pat. No. 7,081,493 the contents of which are incorporated herein by reference, which in turn claims priority to PCT/JP02/02186, filed Mar. 8, 2002, which in turn claims priority to Japanese Application Nos. 2001-074880 and 2001-074884, both filed Mar. 15, 2001.

FIELD OF THE INVENTION

The present invention relates to an automobile part comprising a polypropylene resin composition.

BACKGROUND OF THE INVENTION

Polypropylene resins are used in daily use sundries, kitchen utensils, packing films, household electrical appliances, mechanical parts, electrical components, automobile parts and other various fields. The polypropylene resins are incorporated with various additives in conformity with the demanded performance. In particular, in the use of automobile parts, compositions comprising a polypropylene resin incorporated with an α-olefin copolymer rubber and an inorganic filler such as talc are utilized in large quantities because molded articles exhibit an excellent balance of rigidity and impact resistance.

Automobile parts for inner and outer trims are often formed by injection molding in view of productivity. When an injection molding of the above polypropylene resin composition is carried out, a plurality of periodic striped patterns known as flow marks or tiger marks occur on the surface of injection molded articles in directions crossing with the direction of injection flow, which periodic striped patterns are conspicuous. When flow marks having occurred on the surface of a molded article are conspicuous, the appearance of the molded article would be degraded. Thus, according to necessity, coating or other measures would be carried out in order to cause the flow marks to disappear. For eliminating the flowmarks of the molded article obtained from the above polypropylene resin composition or rendering the flow marks inconspicuous, various methods are employed. For example, a method in which use is made of a metal mold whose temperature can be varied and a resin is injected into the metal mold maintained at a high temperature is employed. However, this method has a problem in production in that a special metal mold is needed and in that the molding cycle is prolonged.

Moreover, with respect to automobile parts for inner trims, the surface thereof is furnished with a pattern known as an emboss for the purpose of decorating the surface or lowering the surface gloss. This emboss is formed by transferring a pattern provided on the inside surface of the metal mold for injection molding to the surface of molded article at the time of injection molding. When an injection molding of the above polypropylene resin composition is conducted, there would occur such problems that the transfer of emboss pattern provided on the inside surface of the metal mold is poor to thereby fail to lower the gloss, and that the transferability is different between the vicinity of a gate of the metal mold and a position remote from the gate to thereby bring about a gloss difference.

In the injection molding, pellets of solid resin composition are heated and melted (plasticized) in a heated cylinder, and the molten resin composition is injected and charged into a metal mold (cavity). The heating and melting of the resin composition used to obtain an injection molded article in the subsequent molding cycle are carried out during the cooling after the completion of the injection and charging. For shortening the molding cycle for obtaining an injection molded article, it is necessary to shorten the cooling time. There would be no problem if the heating and melting of resin composition needed in the subsequent injection and charging can be completed during the shortened cooling time. However, when the heating and melting cannot be completed during the cooling time, the subsequent injection and charging cannot be effected. This causes shortening of the cooling time impracticable. The above polypropylene resin composition necessitates a prolonged heating/melting time (plasticization time) and disenables shortening of the cooling time. Therefore, the above polypropylene resin composition has a drawback in that the molding cycle cannot be shortened.

A composition comprising a polypropylene resin (propylene homopolymer, propylene block copolymer) produced in the presence of a metallocene catalyst, an α-olefin copolymer rubber and an inorganic filler is known as one described in Japanese Patent Laid-open Publication No. 10(1998)-1573. However, in the production of the polypropylene resin in the presence of a metallocene catalyst, 1,3-insertion or 2,1-insertion of propylene occurs in a proportion of about 1%. Thus, the crystallinity of the polypropylene resin is low, so that the melting point thereof is about 150° C., which melting point is lower than 160° C. of the polypropylene resin produced in the presence of a titanium catalyst. Further, the polypropylene resin produced in the presence of a metallocene catalyst is inferior to the polypropylene resin produced in the presence of a titanium catalyst in the tensile strength properties, flexural strength properties, rigidity, etc. Accordingly, the mechanical strength properties of the composition comprising the polypropylene resin produced in the presence of a metallocene catalyst, an α-olefin copolymer rubber and an inorganic filler are poor as compared with those of the composition comprising the polypropylene resin produced in the presence of a titanium catalyst, an α-olefin copolymer rubber and an inorganic filler. Therefore, the former composition has not been put to practical use.

The inventors have made extensive and intensive studies with a view toward solving the above problems. As a result, it has been found that there is substantially no 1,3-insertion or 2,1-insertion of propylene in the propylene homopolymer or propylene block copolymer produced in the presence of a specified metallocene catalyst, so that the melting point of the propylene homopolymer or propylene block copolymer is high and so that the molded article thereof is excellent in the rigidity, tensile strength properties and flexural strength properties. It has further been found that the polypropylene resin composition based on the propylene homopolymer or propylene block copolymer exhibits excellent performance as a composition for automobile part. The present invention has been completed on the basis of these findings.

It is an object of the present invention to solve the above problems of the prior art, specifically to provide an automobile part, especially an injection molded automobile part, which is improved in flow marks and has excellent appearance and emboss transfer.

It is another object of the present invention to provide an automobile part, especially an injection molded automobile part, which has an excellent balance of rigidity and impact resistance.

DISCLOSURE OF THE INVENTION

According to the first aspect of the present invention, there is provided an automobile part comprising a polypropylene resin composition, the polypropylene resin composition comprising 30 to 80% by weight of a propylene homopolymer (A1), 15 to 40% by weight of an elastomer (B) and 5 to 30% by weight of an inorganic filler (C), wherein the propylene homopolymer (A1) exhibits:

(i) a melt flow rate (measured at 230° C. under a load of 2.16 kg according to ASTM D 1238) of 20 to 300 g/10 min, (ii) a proportion of position irregular units derived from 2,1-insertion or 1,3-insertion of propylene monomer relative to all propylene structural units, determined from a $^{13}$C-NMR spectrum, each of 0.2% or less, and (iii) a molecular weight distribution (Mw/Mn), determined by gel permeation chromatography (GPC), of 1 to 3.

According to the second aspect of the present invention, there is provided an automobile part comprising a polypropylene resin composition, the polypropylene resin composition comprising a propylene block copolymer (A2) and an inorganic filler (C) optionally together with an elastomer (B), the propylene block copolymer (A2) comprising propylene homopolymer segment and propylene/α-olefin random copolymer segment, wherein the propylene homopolymer segment of the propylene block copolymer (A2) exhibits:

(i) a melt flow rate (measured at 230° C. under a load of 2.16 kg according to ASTM D 1238) of 20 to 300 g/10 min, (ii) a proportion of position irregular units derived from 2,1-insertion or 1,3-insertion of propylene monomer relative to all propylene structural units, determined from a $^{13}$C-NMR spectrum, each of 0.2% or less, and (iii) a molecular weight distribution (Mw/Mn), determined by gel permeation chromatography (GPC), of 1 to 3, and wherein, based on the total weight of the propylene block copolymer (A2), the elastomer (B) and the inorganic filler (C), in the polypropylene resin composition, the propylene homopolymer segment of the propylene block copolymer (A2) is contained in an amount of 30 to 80% by weight, the propylene/α-olefin random copolymer segment of the propylene block copolymer (A2) plus the elastomer (B) is contained in a total amount of 15 to 40% by weight, and the inorganic filler (C) is contained in an amount of 5 to 30% by weight.

In the automobile parts comprising a polypropylene resin composition according to the first and second aspects of the present invention, it is preferred that the elastomer (B) be at least one elastomer selected from among a propylene/α-olefin random copolymer (B-1), an ethylene/α-olefin random copolymer (B-2), an ethylene/α-olefin/nonconjugated polyene random copolymer (B-3) and a hydrogenated block copolymer (B-4).

It is especially preferred that the inorganic filler (C) be talc.

Preferably, in cross fractionating chromatography (CFC) of the polypropylene resin composition, a 100 to 135° C. eluate with orthodichlorobenzene exhibits a ratio (Mw/Mn) of weight average molecular weight (Mw) to number average molecular weight (Mn) of 1 to 3.

Moreover, it is especially preferred that the automobile part be an injection molded article that, when reflectances (angle of incidence: 90°, angle of reflection: 90° and area where measuring is performed: 4 mmϕ) are measured at intervals of 5 mm in a direction of injection flow over a length of 50 to 150 mm from a flow end, a reflectance difference between neighboring measuring points satisfies the formula:

Δ reflectance difference ≦ 0.5.

PREFERRED EMBODIMENTS OF THE INVENTION

The automobile part comprising a polypropylene resin composition according to the present invention will be described in detail below.

In the automobile part comprising a polypropylene resin composition according to the present invention, the polypropylene resin composition comprises a propylene homopolymer (A1), an elastomer (B) and an inorganic filler (C), or comprises a propylene block copolymer (A2) and an inorganic filler (C) optionally together with an elastomer (B).

Propylene Homopolymer (A1)

The propylene homopolymer (A1) for use in the present invention is a crystalline polypropylene resin characterized by exhibiting:

(i) a melt flow rate (MFR, measured at 230° C. under a load of 2.16 kg according to ASTM D 1238) of 20 to 300 g/10 min, preferably 20 to 250 g/10 min, still preferably 30 to 220 g/10 min, and optimally 40 to 200 g/10 min, (ii) a proportion of position irregular units derived from 2,1-insertion or 1,3-insertion of propylene monomer relative to all propylene structural units, determined from a $^{13}$C-NMR spectrum, each of 0.2% or less, preferably 0.1% or less, and still preferably 0.05% or less, and (iii) a molecular weight distribution (Mw/Mn), determined by gel permeation chromatography (GPC), of 1 to 3, preferably 1 to 2.5, and still preferably 1 to 2.3.

Further, the propylene homopolymer (A1) preferably has the following characteristics (iv), (v) and (vi).

(iv) The n-decane soluble content (% by weight of matter dissolved in n-decane when the propylene homopolymer has been treated with n-decane at 150° C. for 2 hr and cooled to room temperature) of the propylene homopolymer (A1) is 2% by weight or less, preferably 1% by weight or less.

(v) The pentad isotacticity, determined from a $^{13}$C-NMR spectrum, of the propylene homopolymer (A1) is 90% or more, preferably 93% or more, and still preferably 94% or more.

The isotactic pentad fraction (mmmm fraction) indicates the ratio of presence of isotactic chains to pentad units in the molecular chain of propylene block copolymer (A), as measured by means of $^{13}$C-NMR. That is, the isotactic pentad fraction (mmmm fraction) is the fraction of propylene monomer unit existing in the center of a chain consisting of five propylene monomer units continuously meso-bonded to each other. Specifically, the isotactic pentad fraction (mmmm fraction) is a value calculated as the fraction of mmmm peaks among all absorption peaks in the methyl carbon region measured from a $^{13}$C-NMR spectrum.

(vi) In the measurement by means of a differential scanning calorimeter (DSC), it is generally preferred that the temperature (Tm) at the maximum peak position of the obtained endothermic curve be in the range of 155 to 170° C., especially 157 to 165° C., and still especially 158 to 163° C.

The propylene homopolymer (A1) for use in the present invention is prepared, for example, in the presence of a specified metallocene catalyst. A metallocene compound catalyst component for forming this metallocene catalyst is represented by the following general formula (1) or (2):

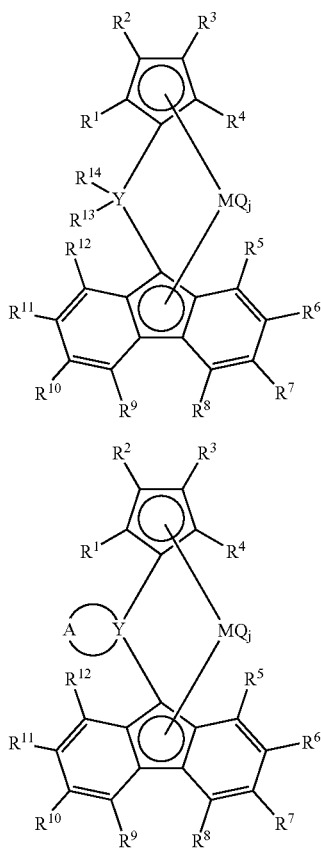

(1)

(2)

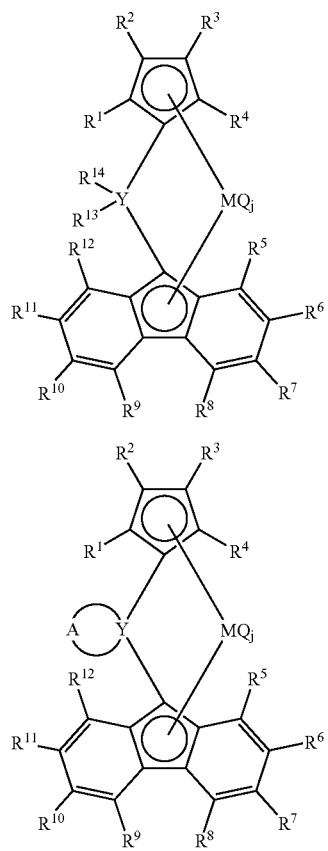

(1a)

(2a)

wherein:

$R^3$ is selected from among hydrocarbon groups and silicon-containing hydrocarbon groups;

$R^1$, $R^2$, $R^4$, $R^5$, $R^6$, $R^7$, $R^8$, $R^9$, $R^{10}$, $R^{11}$, $R^{12}$, $R^{13}$ and $R^{14}$ may be identical with or different from each other, and each thereof is selected from among a hydrogen atom, hydrocarbon groups and silicon-containing hydrocarbon groups, provided that, among the groups represented by $R^1$ to $R^{12}$, neighboring groups may be bonded with each other to thereby form a ring, and provided that, in the general formula (1), a group selected from those of $R^1$, $R^4$, $R^5$ and $R^{12}$ may be bonded with a group represented by $R^{13}$ or $R^{14}$ to thereby form a ring;

A represents a divalent hydrocarbon group having 2 to 20 carbon atoms, which may contain an unsaturated bond and/or an aromatic ring, provided that A may contain two or more ring structures including a ring formed thereby with an atom represented by Y;

Y represents a carbon atom or a silicon atom;

M represents a metal selected from among those of the group 4 of the periodic table;

j is an integer of 1 to 4; and

Q is selected from among halogen atoms, hydrocarbon groups, anionic ligands and neutral ligands capable of coordination with a lone electron pair, provided that, when j is 2 or greater, Qs may be identical with or different from each other.

Another metallocene compound catalyst component for use in the present invention consists of a metallocene compound represented by the following general formula (1a) or (2a):

wherein:

$R^3$ is selected from among hydrocarbon groups and silicon-containing hydrocarbon groups;

$R^1$, $R^2$, $R^4$, $R^5$, $R^6$, $R^7$, $R^8$, $R^9$, $R^{10}$, $R^{11}$, $R^{12}$, $R^{13}$ and $R^{14}$ may be identical with or different from each other, and each thereof is selected from among a hydrogen atom, hydrocarbon groups and silicon-containing hydrocarbon groups, provided that, with respect to the compound of the general formula (1a) wherein $R^3$ represents a tert-butyl group or a trimethylsilyl group and wherein $R^{13}$ and $R^{14}$ simultaneously represent methyl or phenyl groups, $R^6$ and $R^{11}$ do not simultaneously represent hydrogen atoms, provided that, among the groups represented by $R^1$ to $R^{12}$, neighboring groups may be bonded with each other to thereby form a ring, and provided that, in the general formula (1a), a group selected from among those of $R^1$, $R^4$, $R^5$ and $R^{12}$ may be bonded with a group represented by $R^{13}$ or $R^{14}$ to thereby form a ring;

A represents a divalent hydrocarbon group having 2 to 20 carbon atoms, which may contain an unsaturated bond and/or an aromatic ring, provided that A may contain two or more ring structures including a ring formed thereby with an atom represented by Y;

Y represents a carbon atom or a silicon atom;

M represents a metal selected from among those of the group 4 of the periodic table;

j is an integer of 1 to 4; and

Q is selected from among halogen atoms, hydrocarbon groups, anionic ligands and neutral ligands capable of coordination with a lone electron pair, provided that, when j is 2 or greater, Qs may be identical with or different from each other.

Still another metallocene compound catalyst component consists of a metallocene compound represented by the following general formula (1b) or (2b):

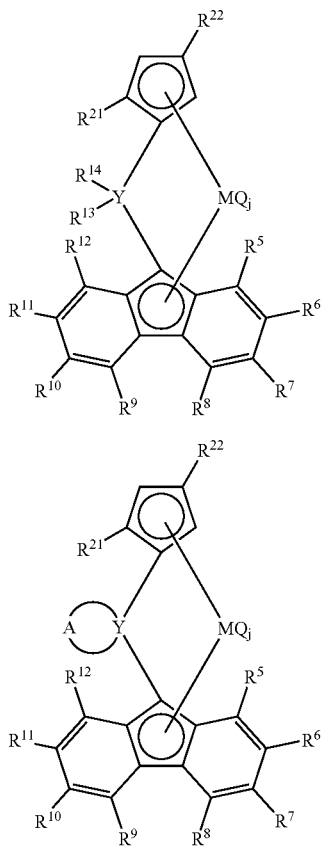

wherein:

$R^{21}$ and $R^{22}$ may be identical with or different from each other, and each thereof is selected from among hydrocarbon groups and silicon-containing hydrocarbon groups;

$R^5$, $R^6$, $R^7$, $R^8$, $R^9$, $R^{10}$, $R^{11}$, $R^{12}$, $R^{13}$ and $R^{14}$ may be identical with or different from each other, and each thereof is selected from among a hydrogen atom, hydrocarbon groups and silicon-containing hydrocarbon groups, provided that, among the groups represented by $R^5$ to $R^{12}$, neighboring groups may be bonded with each other to thereby form a ring;

A represents a divalent hydrocarbon group having 2 to 20 carbon atoms, which may contain an unsaturated bond and/or an aromatic ring, provided that A may contain two or more ring structures including a ring formed thereby with an atom represented by Y;

M represents a metal selected from among those of the group 4 of the periodic table;

Y represents a carbon atom or a silicon atom;

j is an integer of 1 to 4; and

Q is selected from among halogen atoms, hydrocarbon groups, anionic ligands and neutral ligands capable of coordination with a lone electron pair, provided that, when j is 2 or greater, Qs may be identical with or different from each other.

Preferred examples of the above hydrocarbon groups include an alkyl group having 1 to 20 carbon atoms, an arylalkyl group having 7 to 20 carbon atoms, an aryl group having 6 to 20 carbon atoms and an alkylaryl group having 7 to 20 carbon atoms.

$R^3$ may be a cyclic hydrocarbon group containing a heteroatom such as sulfur or oxygen, such as a thienyl group or a furyl group.

For example, there can be mentioned hydrocarbon groups such as methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, naphthyl and tolyl.

Preferred examples of the above silicon-containing hydrocarbon groups include an arylsilyl or alkylsilyl group having 1 to 4 silicon atoms and having 3 to 20 carbon atoms.

Specifically, there can be mentioned groups such as trimethylsilyl, tert-butyldimethylsilyl and triphenylsilyl.

$R^3$ preferably represents a sterically bulky substituent, still preferably a substituent having 4 or more carbon atoms.

In the above general formula (1) or (2), $R^1$, $R^2$, $R^4$, $R^5$, $R^6$, $R^7$, $R^8$, $R^9$, $R^{10}$, $R^{11}$, $R^{12}$, $R^{13}$, and $R^{14}$ may be identical with or different from each other, and each thereof is selected from among a hydrogen atom, hydrocarbon groups and silicon-containing hydrocarbon groups. Preferred examples of the hydrocarbon groups and silicon-containing hydrocarbon groups are as mentioned above.

With respect to $R^1$ to $R^4$ as substituents of the cyclopentadienyl ring, neighboring substituents may be bonded with each other to thereby form a ring. Examples of such substituted cyclopentadienyl groups include indenyl, 2-methylindenyl, tetrahydroindenyl, 2-methyltetrahydroindenyl and 2,4,4-trimethyltetrahydroindenyl.

With respect to $R^5$ to $R^{12}$ as substituents of the fluorene ring, neighboring substituents may be bonded with each other to thereby form a ring. Examples of such substituted fluorenyl groups include benzofluorenyl, dibenzofluorenyl, octahydrodibenzofluorenyl and octamethyloctahydrodibenzofluorenyl.

With respect to $R^5$ to $R^{12}$ as substituents of the fluorene ring, it is preferred that these substituents be symmetrical from the viewpoint of easiness in synthesis. That is, it is preferred that the group $R^5$ be identical with the group $R^{12}$ the group $R^6$ with the group $R^{11}$, the group $R^7$ with the group $R^{10}$, and the group $R^8$ with the group $R^9$. It is especially preferred to employ nonsubstituted fluorene, 3,6-disubstituted fluorene, 2,7-disubstituted fluorene or 2,3,6,7-tetrasubstituted fluorene. The 3-position, 6-position, 2-position and 7-position of the fluorene ring correspond to $R^7$, $R^{10}$, $R^6$ and $R^{11}$, respectively.

In the above general formula (1) or (2), Y represents a carbon atom or a silicon atom.

In the metallocene compound of the above general formula (1), $R^{13}$ and $R^{14}$ are bonded with Y to thereby form a substituted methylene group or substituted silylene group as a bridging moiety. Preferably, the bridging moiety can be, for example, methylene, dimethylmethylene, diethylmethylene, diisopropylmethylene, methyl-tert-butylmethylene, di-tert-butylmethylene, dicyclohexylmethylene, methylcyclohexylmethylene, methylphenylmethylene, diphenylmethylene, methylnaphthylmethylene, dinaphthylmethylene, or dimethylsilylene, diisopropylsilylene, methyl-tert-butylsilylene, dicyclohexylsilylene, methylcyclohexylsilylene, methylphenylsilylene, diphenylsilylene, methylnaphthylsilylene or dinaphthylsilylene.

In the metallocene compound of the above general formula (1), a substituent selected from among those of $R^1$, $R^4$, $R^5$ and $R^{12}$ may be bonded with a substituent represented by $R^{13}$ or $R^{14}$ of the bridging moiety to thereby form a ring. As examples of such structures, structures wherein $R^1$ and $R^{14}$ are bonded with each other to thereby form a ring will be shown below. In the metallocene compound of the following general formula (1c), the bridging moiety and the cyclopentadienyl group join together to thereby form a tetrahydropentalene skeleton. In the metallocene compound of the following general formula (1d), the bridging moiety and the cyclopentadienyl group join together to thereby form a tetrahydroindenyl skeleton. Likewise, the bridging moiety may be bonded with the fluorenyl group to thereby form a ring.

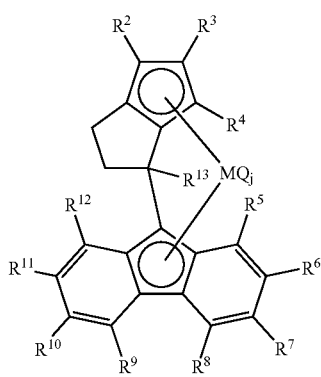

(1c)

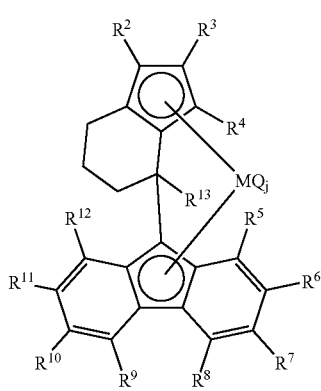

(1d)

In the metallocene compound of the above general formula (2), A represents a divalent hydrocarbon group having 2 to 20 carbon atoms, which may contain an unsaturated bond and/or an aromatic ring. Y is bonded with this A to thereby form, for example, a cycloalkylidene group or a cyclomethylenesilylene group.

A may contain two or more ring structures including a ring formed thereby with Y.

Preferred examples thereof include cyclopropylidene, cyclobutylidene, cyclopentylidene, cyclohexylidene, cycloheptylidene, bicyclo[3,3,1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene and cycloheptamethylenesilylene.

In the above general formula (1) or (2), M represents a metal selected from among those of the group 4 of the periodic table. For example, it can be titanium, zirconium or hafnium.

In the above general formula (1) or (2), j is an integer of 1 to 4.

In the above general formula (1) or (2), Q is selected from among halogen atoms, hydrocarbon groups having 1 to 20 carbon atoms, anionic ligands, and neutral ligands capable of coordination with a lone electron pair. When j is 2 or greater, Qs may be identical with or different from each other.

Examples of the halogen atoms include fluorine, chlorine, bromine and iodine. Examples of the hydrocarbon groups are as aforementioned.

Examples of the anionic ligands include alkoxy groups such as methoxy, tert-butoxy and phenoxy; carboxylate groups such as acetate and benzoate; and sulfonate groups such as mesylate and tosylate.

Examples of the neutral ligands capable of coordination with a lone electron pair include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane.

It is preferred that at least one of Qs be a halogen or an alkyl group.

Examples of the metallocene compounds of general formula (1) or (2) according to the present invention will be set forth below.

First, the ligand structure, excluding MQj (metal portion), of each metallocene compound will be divided into three moieties, namely, Cp (cyclopentadienyl ring portion), Bridge (bridging portion) and Flu (fluorenyl ring portion) for the purpose of indication on tables. Specific examples of the structures of individual moieties and specific examples of the ligand structures obtained by combinations thereof will be set forth below.

Specific Examples of Cp

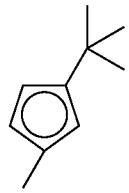

a1

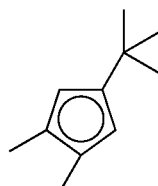

a2

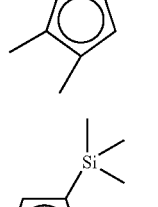

a3

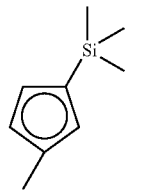

a4

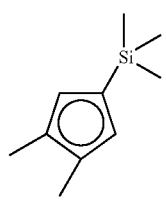

-continued
a5
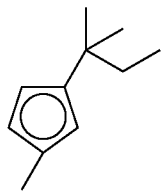
a6
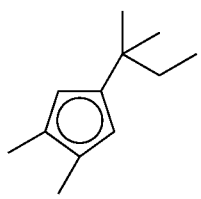
a7
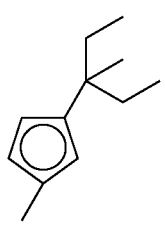
a8
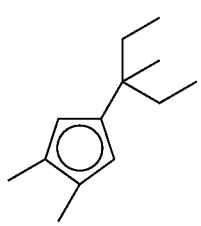
a9
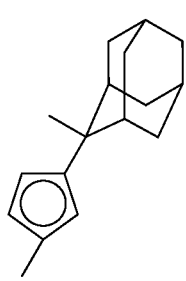
a10
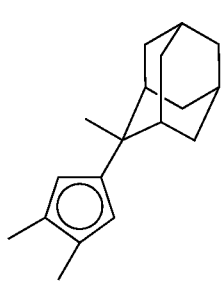
a11
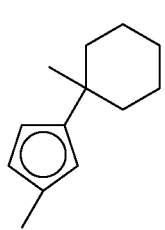
-continued
a12
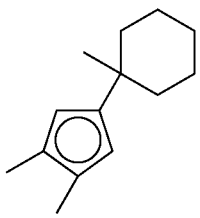
a13
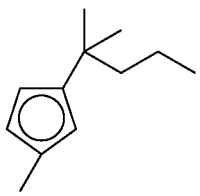
a14
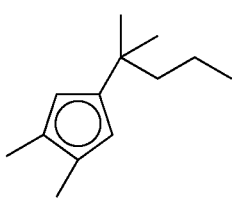
a15
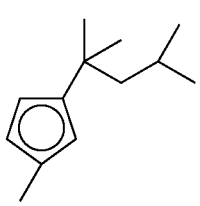
a16
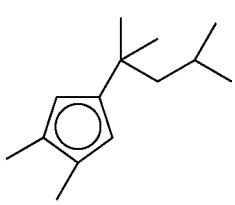
a17
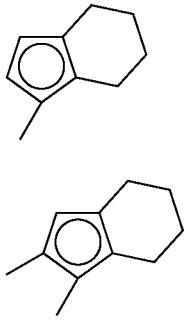
a18
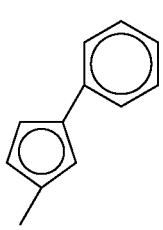
a19
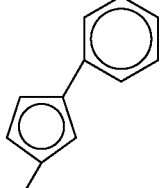

-continued
a20 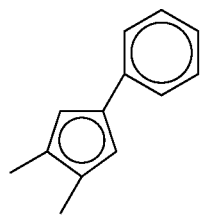
a21 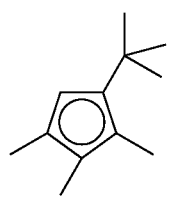
a22 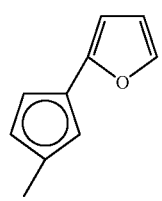
a23 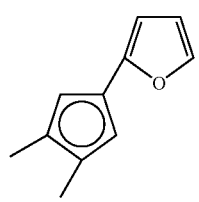
a24 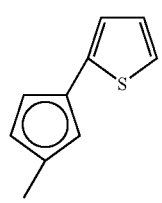
a25 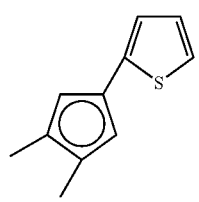
Specific Examples of Bridge
b1 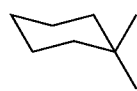
b2 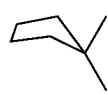
-continued
b3 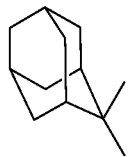
b4 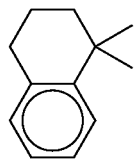
b5 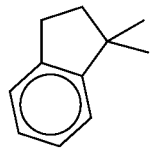
b6 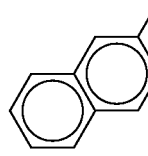
b7 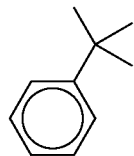
b8 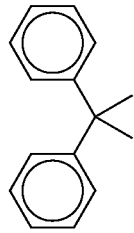
b9 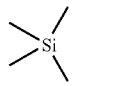
b10 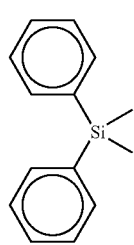
b11 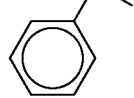

-continued

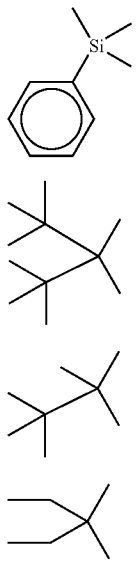

Specific Examples of Flu

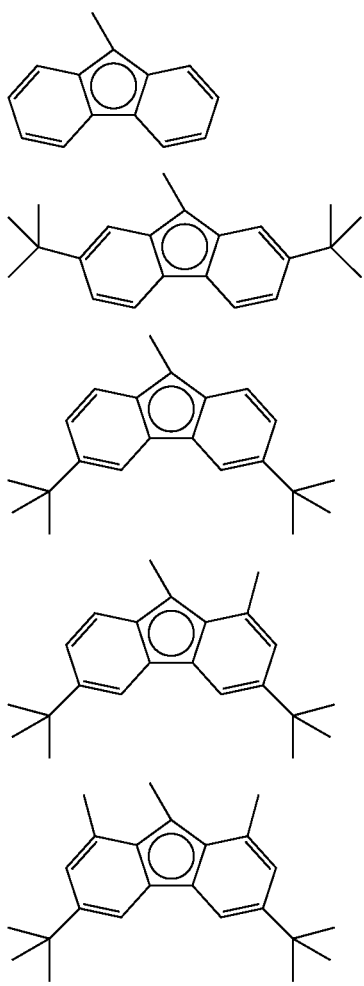

-continued

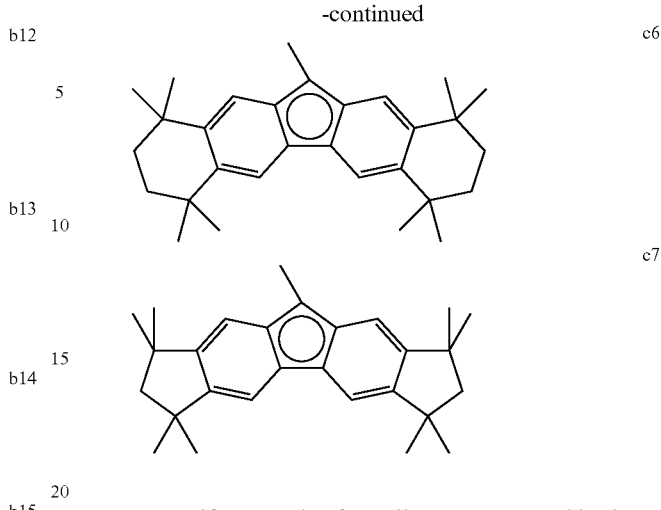

As a specific example of metallocene compound having a preferred ligand structure, there can be mentioned the compound of the formula:

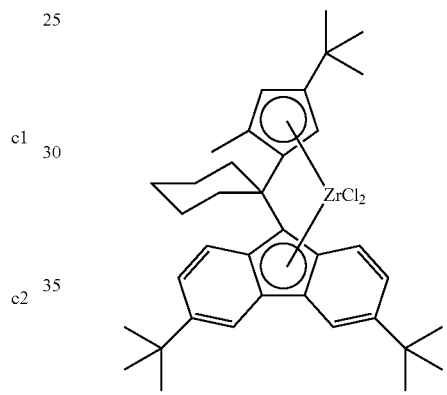

MQj can be, for example, any of $ZrCl_2$, $ZrBr_2$, $ZrMe_2$, $Zr(OTs)_2$, $Zr(OMs)_2$, $Zr(OTf)_2$, $TiCl_2$, $TiBr_2$, $TiMe_2$, $Ti(OTs)_2$, $Ti(OMs)_2$, $Ti(OTf)_2$, $HfCl_2$, $HfBr_2$, $HfMe_2$, $Hf(OTs)_2$, $Hf(OMs)_2$ and $Hf(OTf)_2$. In these, Ts represents a p-toluenesulfonyl group; Ms represents a methanesulfonyl group; and Tf represents a trifluoromethanesulfonyl group.

Further, as metallocene compounds wherein a substituent of the Cp ring is bonded with a substituent of the bridging portion to thereby form a ring, there can be mentioned compounds of the formulae:

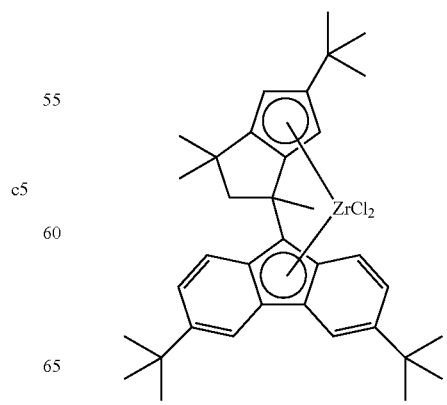

-continued

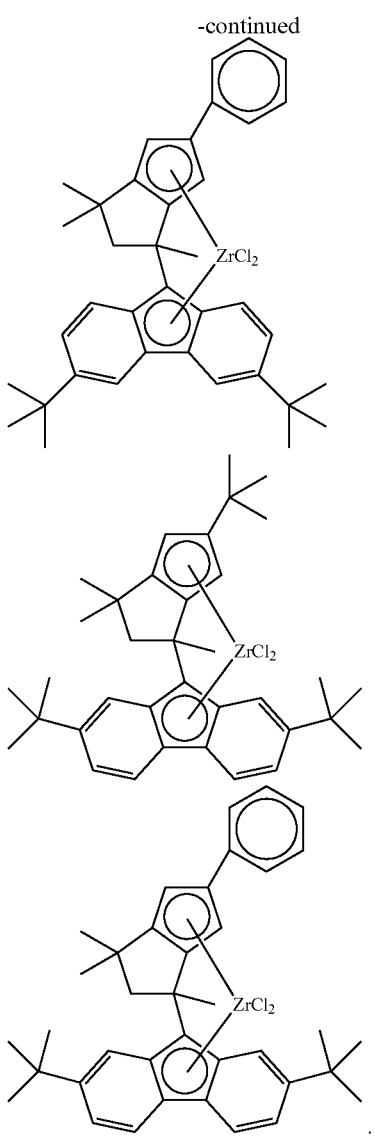

Preferred examples of the metallocene compounds of general formula (1) or (2) according to the present invention include:

metallocene compound of the general formula (1) wherein each of $R^1$, $R^{13}$ and $R^{14}$ represents methyl; $R^3$ represents tert-butyl; each of $R^2$, $R^4$, $R^5$, $R^7$, $R^8$, $R^9$, $R^{10}$ and $R^{12}$ represents hydrogen; each of $R^6$ and $R^{11}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents 1-methyl-1-cyclohexyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents tert-butyl; each of $R^1$, $R^2$, $R^4$, $R^5$, $R^8$, $R^9$ and $R^{12}$ represents hydrogen; $R^6$ and $R^7$ are bonded with each other to thereby form a ring as represented by the formula —(C(CH$_3$)$_2$CH$_2$CH$_2$C(CH$_3$)$_2$)—; $R^{10}$ and $R^{11}$ are bonded with each other to thereby form a ring as represented by the formula —(C(CH$_3$)$_2$CH$_2$CH$_2$C(CH$_3$)$_2$)—; M represents zirconium; Y represents carbon; Q represents chlorine; and j is 2;

metallocene compound of the general formula (1) wherein each of $R^{13}$ and $R^{14}$ represents methyl; $R^3$ represents trimethylsilyl; each of $R^1$, $R^2$, $R^4$, $R^5$, $R^8$, $R^9$ and $R^{12}$ represents hydrogen; $R^6$ and $R^7$ are bonded with each other to thereby form a ring as represented by the formula —(C(CH$_3$)$_2$CH$_2$CH$_2$C(CH$_3$)$_2$)—; $R^{10}$ and $R^{11}$ are bonded with each other to thereby form a ring as represented by the formula —(C(CH$_3$)$_2$CH$_2$CH$_2$C(CH$_3$)$_2$)—; M represents zirconium; Y represents carbon; Q represents chlorine; and j is 2;

metallocene compound of the general formula (1) wherein each of $R^{13}$ and $R^{14}$ represents methyl; $R^3$ represents 1,1-dimethylpropyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents 1-ethyl-1-methylpropyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents 1,1,3-trimethylbutyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents 1,1-dimethylbutyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents tert-butyl; each of $R^1$, $R^2$, $R^4$, $R^5$, $R^7$, $R^8$, $R^9$, $R^{10}$ and $R^{12}$ represents hydrogen; each of $R^6$ and $R^{11}$ represents tert-butyl; M represents zirconium; Y represents carbon; Q represents chlorine; and j is 2;

metallocene compound of the general formula (1) wherein each of $R^3$, $R^{13}$ and $R^{14}$ represents phenyl; each of $R^1$, $R^2$, $R^4$, $R^5$, $R^8$, $R^9$ and $R^{12}$ represents hydrogen; $R^6$ and $R^7$ are bonded with each other to thereby form a ring as represented by the formula —(C(CH$_3$)$_2$CH$_2$CH$_2$C(CH$_3$)$_2$)—; $R^{10}$ and $R^{11}$ are bonded with each other to thereby form a ring as represented by the formula —(C(CH$_3$)$_2$CH$_2$CH$_2$C(CH$_3$)$_2$)—; M represents zirconium; Y represents carbon; Q represents chlorine; and j is 2;

metallocene compound of the general formula (1) wherein $R^3$ represents trimethylsilyl; each of $R^{13}$ and $R^{14}$ represents phenyl; each of $R^1$, $R^2$, $R^4$, $R^5$, $R^8$, $R^9$ and $R^{12}$ represents hydrogen; $R^6$ and $R^7$ are bonded with each other to thereby form a ring as represented by the formula —(C(CH$_3$)$_2$CH$_2$CH$_2$C(CH$_3$)$_2$)—; $R^{10}$ and $R^{11}$ are bonded with each other to thereby form a ring as represented by the formula —(C(CH$_3$)$_2$CH$_2$CH$_2$C(CH$_3$)$_2$)—; M represents zirconium; Y represents carbon; Q represents chlorine; and j is 2;

metallocene compound of the general formula (1) wherein $R^{13}$ represents methyl; $R^{14}$ represents phenyl; $R^3$ represents tert-butyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents ethyl; $R^3$ represents tert-butyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (2) wherein $R^1$ represents methyl; $R^3$ represents tert-butyl; each of $R^2$, $R^4$, $R^5$ $R^6$, $R^7$, $R^8$, $R^9$, $R^{10}$, $R^{11}$ and $R^{12}$ represents hydrogen; M represents zirconium; Y represents carbon; Q represents chlorine; j is 2; and A represents —$(CH_2)_5$—;

metallocene compound of the general formula (2) wherein $R^1$ represents methyl; $R^3$ represents tert-butyl; each of $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; j is 2; and A represents —$(CH_2)_5$—;

metallocene compound of the general formula (2) wherein $R^3$ represents trimethylsilyl; each of $R^1$, $R^2$, $R^4$, $R^5$, $R^7$, $R^8$, $R^9$, $R^{10}$ and $R^{12}$ represents hydrogen; each of $R^6$ and $R^{11}$ represents tert-butyl; M represents zirconium; Y represents carbon; Q represents chlorine; j is 2; and A represents —$(CH_2)_5$—;

metallocene compound of the general formula (2) wherein $R^3$ represents trimethylsilyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; j is 2; and A represents —$(CH_2)_5$—;

metallocene compound of the general formula (2) wherein $R^3$ represents tert-butyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; j is 2; and A represents —$(CH_2)_4$—;

metallocene compound of the general formula (2) wherein $R^3$ represents 1,1-dimethylpropyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; j is 2; and A represents —$(CH_2)_5$—;

metallocene compound of the general formula (2) wherein $R^3$ represents tert-butyl; each of $R^1$, $R^2$, $R^4$, $R^5$, $R^8$, $R^9$ and $R^{12}$ represents hydrogen; $R^6$ and $R^7$ are bonded with each other to thereby form a ring as represented by the formula —$C(CH_3)_2CH_2CH_2C(CH_3)_2$—; $R^{10}$ and $R^{11}$ are bonded with each other to thereby form a ring as represented by the formula —$C(CH_3)_2CH_2CH_2C(CH_3)_2$—; M represents zirconium; Y represents carbon; Q represents chlorine; j is 2; and A represents —$(CH_2)_4$—;

metallocene compound of the general formula (1) wherein each of $R^1$, $R^{13}$ and $R^{14}$ represents methyl; $R^3$ represents tert-butyl; each of $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^{13}$ and $R^{14}$ represents methyl; $R^3$ represents tert-butyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2;

metallocene compound of the general formula (1) wherein each of $R^1$, $R^{13}$ and $R^{14}$ represents methyl; $R^3$ represents tert-butyl; each of $R^2$, $R^4$, $R^5$, $R^6$, $R^7$, $R^8$, $R^9$, $R^{10}$, $R^{11}$ and $R^{12}$ represents hydrogen; M represents zirconium; Y represents carbon; Q represents chlorine; and j is 2;

metallocene compound of the general formula (1) wherein each of $R^{13}$ and $R^{14}$ represents methyl; $R^3$ represents trimethylsilyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2; and metallocene compound of the general formula (1) wherein each of $R^{13}$ and $R^{14}$ represents phenyl; $R^3$ represents trimethylsilyl; each of $R^1$, $R^2$, $R^4$, $R^5$, $R^6$, $R^8$, $R^9$, $R^{11}$ and $R^{12}$ represents hydrogen; each of $R^7$ and $R^{10}$ represents tert-butyl; M represents zirconium; Y represents carbon; Q represents chlorine; and j is 2.

These metallocene compounds can be used individually or in combination. These metallocene compounds can be used in a form on a particulate support.

As the particulate support, there can be employed an inorganic support such as $SiO_2$, $Al_2O_3$, $B_2O_3$, MgO, $ZrO_2$, CaO, $TiO_2$, ZnO, $SnO_2$, BaO or ThO, or an organic support such as polyethylene, propylene block copolymer, poly-1-butene, poly-4-methyl-1-pentene or styrene/divinylbenzene copolymer. These particulate supports can be used individually or in combination.

In the present invention, an aluminoxane can be used as a co-catalyst for the above metallocene catalyst. As known in the art to which the present invention pertains, the aluminoxane can be produced by, for example, the following methods.

(1) One method comprises adding an organoaluminum compound such as a trialkylaluminum to a hydrocarbon medium suspension of a compound containing an adsorbed water or a salt containing water of crystallization, for example, magnesium chloride hydrate, copper sulfate hydrate, aluminum sulfate hydrate, nickel sulfate hydrate or cerium (I) chloride hydrate to thereby effect a reaction thereof.

(2) Another method comprises causing water, ice or steam to directly act on an organoaluminum compound such as a trialkylaluminum in a medium such as benzene, toluene, ethyl ether or tetrahydrofuran.

(3) Still another method comprises reacting an organic tin oxide such as dimethyltin oxide or dibutyltin oxide, with an organoaluminum compound such as a trialkylaluminum, in a medium such as decane, benzene or toluene.

The organoaluminum compound for use in the preparation of an aluminoxane can be, for example, any of trialkylaluminums such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminums such as tricyclohexylaluminum and tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide. Of these, trialkylaluminums and tricycloalkylaluminums are preferred. Trimethylaluminum is especially preferred.

As the organoaluminum compound for use in the preparation of an aluminoxane, there can be employed an isoprenylaluminum.

The solvent for use in an aluminoxane solution or suspension can be a hydrocarbon solvent, for example, an aromatic hydrocarbon such as benzene, toluene, xylene, cumene or cymene; an aliphatic hydrocarbon such as pentane, hexane, heptane, octane, decane, dodecane, hexadecane or octadecane; an alicyclic hydrocarbon such as cyclopentane, cyclohexane, cyclooctane or methylcyclopentane; a petroleum fraction such as gasoline, kerosene or gas oil; or a halide, for example, a chloride or bromide of the above aromatic hydrocarbon, aliphatic hydrocarbon or alicyclic hydrocarbon.

In addition, use can be made of an ether such as ethyl ether or tetrahydrofuran. Of these solvents, the aromatic hydrocarbon and aliphatic hydrocarbon are preferred.

The organoaluminum oxy compound may contain a small amount of a component consisting of an organic compound of a metal other than aluminum. As examples of ionized ionic compounds, there can be mentioned a Lewis acid, an ionic compound, a borane compound and a carborane compound.

As the Lewis acid, there can be mentioned a compound of the formula $BR_3$, wherein R represents a phenyl group unsubstituted or substituted with a fluorine atom, a methyl group or a trifluoromethyl group, or represents a fluorine atom. This compound can be, for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron or tris(3,5-dimethylphenyl)boron.

As the ionic compound, there can be mentioned, for example, a trialkyl substituted ammonium salt, an N,N-dialkylanilinium salt, a dialkylammonium salt or a triarylphosphonium salt. Specifically, the trialkyl substituted ammonium salt can be, for example, triethylammoniumtetra(phenyl)boron, tripropylammoniumtetra(phenyl)boron or tri(n-butyl)ammoniumtetra(phenyl)boron. The dialkylammonium salt can be, for example, di(1-propyl)ammoniumtetra(pentafluorophenyl)boron or dicyclohexylammoniumtetra(phenyl)boron. As other ionic compounds, there can be mentioned, for example, triphenylcarbenium tetrakis(pentafluorophenyl)borate, N,N-dimethylanilinium tetrakis(pentafluorophenyl)borate and ferrocenium tetra(pentafluorophenyl)borate.

As the borane compound, there can be mentioned, for example, decaborane (14), bis[tri(n-butyl)ammonium]nonaborate, bis[tri(n-butyl)ammonium]decaborate, or a salt of metal borane anion such as bis [tri(n-butyl)ammonium]bis (dodecahydrododecaborate) nickelic acid (III) salt.

As the carborane compound, there can be mentioned, for example, 4-carbanonaborane (14), 1,3-dicarbanonaborane (13), or a salt of metal carborane anion such as bis[tri(n-butyl)ammonium]bis(undecahydrido-7-carbaundecaborate)nickelic acid (IV) salt.

These ionized ionic compounds can be used individually or in combination. The above organoaluminum oxy compounds and ionized ionic compounds can be used in a form on the above particulate support.

At the time of preparing this catalyst, the following organoaluminum compound may be used in combination with the organoaluminum oxy compound or ionized ionic compound.

A compound having at least one Al-carbon bond in its molecule can be used as the organoaluminum compound. As this compound, there can be mentioned, for example, an organoaluminum compound of the general formula:

$(R^1)_mAl(O(R^2))_nH_pX_q$ wherein $R^1$ and $R^2$ may be identical with or different from each other, and each thereof represents a hydrocarbon group generally having 1 to 15, preferably 1 to 4, carbon atoms; X represents a halogen atom; and m, n, p and q are numbers satisfying the relationships 0<m<3, 0≦n<3, 0≦p<3 and 0≦q<3, respectively, provided that m+n+p+q=3.

The propylene homopolymer (A1) for use in the present invention can be prepared by homopolymerization of propylene in the presence of the above metallocene catalyst.

In the process for producing the propylene homopolymer (A1), the polymerization is generally performed at about −50 to 200° C., preferably about 50 to 100° C., under atmospheric pressure to 100 kg/cm², preferably about 2 to 50 kg/cm². The polymerization of propylene can be performed by any of batch, semicontinuous and continuous processes.

Propylene Block Copolymer (A2)

The propylene block copolymer (A2) for use in the present invention is a block copolymer comprising propylene homopolymer segment and propylene/α-olefin random copolymer segment. The α-olefin content of propylene block copolymer (A2) as a whole is in the range of 1 to 40% by weight, preferably 3 to 30% by weight.

The propylene block copolymer (A2) for use in the present invention comprises propylene homopolymer segment which is insoluble in n-decane at room temperature, optionally together with polyethylene segment, and propylene/α-olefin random copolymer segment which is soluble in n-decane at room temperature.

The propylene homopolymer segment of the propylene block copolymer (A2) for use in the present invention is characterized by having:

(i) a melt flow rate (MFR, measured at 230° C. under a load of 2.16 kg according to ASTM D 1238) of 20 to 300 g/10 min, preferably 20 to 250 g/10 min, still preferably 30 to 220 g/10 min, and optimally 40 to 200 g/10 min, (ii) a proportion of position irregular units derived from 2,1-insertion or 1,3-insertion of propylene monomer relative to all propylene structural units, determined from a $^{13}$C-NMR spectrum, each of 0.2% or less, preferably 0.1% or less, and still preferably 0.05% or less, and (iii) a molecular weight distribution (Mw/Mn), determined by gel permeation chromatography (GPC), of 1 to 3, preferably 1 to 2.5, and still preferably 1 to 2.3.

Further, the propylene homopolymer segment preferably has the following characteristics (iv), (v) and (vi).

(iv) The n-decane soluble content (% by weight of matter dissolved in n-decane when the propylene homopolymer has been treated with n-decane at 150° C. for 2 hr and cooled to room temperature) of the propylene homopolymer segment is 2% by weight or less, preferably 1% by weight or less.

(v) The pentad isotacticity, determined from a $^{13}$C-NMR spectrum, of the propylene homopolymer segment is 90% or more, preferably 93% or more, and still preferably 95% or more.

The isotactic pentad fraction (mmmm fraction) indicates the ratio of presence of isotactic chains to pentad units in the molecular chain of propylene block copolymer (A2), as measured by means of $^{13}$C-NMR. That is, the isotactic pentad fraction (mmmm fraction) is the fraction of propylene monomer unit existing in the center of a chain consisting of five propylene monomer units continuously meso-bonded to each other. Specifically, the isotactic pentad fraction (mmmm fraction) is a value calculated as the fraction of mmmm peaks among all absorption peaks in the methyl carbon region, measured from a $^{13}$C-NMR spectrum.

(vi) In the measurement by means of a differential scanning calorimeter (DSC), it is generally preferred that the temperature (Tm) at the maximum peak position of the obtained endothermic curve be in the range of 155 to 170° C., especially 155 to 165° C., and still especially 157 to 163° C.

It is preferred that the propylene block copolymer (A2) for use in the present invention contain a component which is soluble in n-decane at room temperature, namely, propylene/α-olefin random copolymer segment in an amount of 1 to 40% by weight, especially 3 to 30% by weight, still especially 5 to 25% by weight, and yet still especially 5 to 15% by weight, based on the weight of propylene block copolymer (A2).

The component soluble in n-decane at room temperature of the propylene block copolymer (A2) preferably contains units derived from an α-olefin other than propylene in an amount of 30 to 60 mol %, still preferably 35 to 55 mol %.

The above α-olefin other than propylene is, for example, an α-olefin other than propylene having 2 to 20 carbon atoms, such as ethylene, 1-butene, 1-pentene, 1-hexene, 1-heptene, 1-octene, 1-decene, 1-dodecene, 1-hexadecene or 4-methyl-1-pentene.

The melt flow rate (MFR, measured at 230° C. under a load of 2.16 kg according to ASTM D 1238) of the propylene block copolymer (A2) is generally in the range of 10 to 150 g/10 min, preferably 20 to 120 g/10 min, still preferably 30 to 100 g/10 min, and optimally 40 to 90 g/10 min.

The propylene block copolymer (A2) for use in the present invention is prepared with the use of, for example, the specified metallocene catalyst described hereinbefore with respect to the propylene homopolymer (A1).

The propylene block copolymer (A2) for use in the present invention can be prepared by carrying out, in the presence of the above metallocene catalyst, a polymerization of propylene to thereby form propylene homopolymer segment and a copolymerization of ethylene and propylene to thereby form ethylene/propylene copolymer segment in an arbitrary sequence.

In the process for producing the propylene block copolymer (A2), the polymerization is generally performed at about −50 to 200° C., preferably about 50 to 100° C., under atmospheric pressure to 100 kg/cm$^2$, preferably about 2 to 50 kg/cm$^2$. The (co)polymerization of propylene can be performed by any of batch, semicontinuous and continuous processes.

Elastomer (B)

The elastomer (B) for use in the present invention can be any of a propylene/α-olefin random copolymer (B-1), an ethylene/α-olefin random copolymer (B-2), an ethylene/α-olefin/nonconjugated polyene random copolymer (B-3), a hydrogenated block copolymer (B-4), other elastic polymers and mixtures of these.

The above propylene/α-olefin random copolymer (B-1) is a random copolymer rubber of propylene and ethylene or an α-olefin having 4 to 20 carbon atoms.

The α-olefin having 4 to 20 carbon atoms can be, for example, any of 1-butene, 1-pentene, 1-hexene, 4-methyl-1-pentene, 1-heptene, 1-octene, 1-decene, 1-dodecene, 1-tetradecene, 1-hexadecene and 1-eicosene. These α-olefins and ethylene can be used individually or in combination. Among these, ethylene is especially preferably employed.

In the propylene/α-olefin random copolymer (B-1), it is preferred that the molar ratio of propylene to α-olefin (propylene/α-olefin) be in the range of 90/10 to 55/45, especially 80/20 to 55/45.

The melt flow rate (MFR, measured at 230° C. under a load of 2.16 kg according to ASTM D 1238) of the propylene/α-olefin random copolymer (B-1) is preferably 0.1 g/10 min or greater, still preferably in the range of 0.3 to 20 g/10 min.

The above ethylene/α-olefin random copolymer (B-2) is a random copolymer rubber of ethylene and an α-olefin having 3 to 20 carbon atoms.

The α-olefin having 3 to 20 carbon atoms can be, for example, any of propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. These α-olefins can be used individually or in combination. Among these, propylene, 1-butene, 1-hexene and 1-octene are especially preferably employed.

In the ethylene/α-olefin random copolymer (B-2), it is preferred that the molar ratio of ethylene to α-olefin (ethylene/α-olefin) be in the range of 95/5 to 60/40, especially 90/10 to 70/30.

The melt flow rate (MFR, measured at 230° C. under a load of 2.16 kg according to ASTM D 1238) of the ethylene/α-olefin random copolymer (B-2) is preferably 0.1 g/10 min or greater, still preferably in the range of 0.3 to 20 g/10 min.

The above ethylene/α-olefin/nonconjugated polyene random copolymer (B-3) is a random copolymer rubber of ethylene, an α-olefin having 3 to 20 carbon atoms and a nonconjugated polyene.

Examples of suitable α-olefins each having 3 to 20 carbon atoms are as mentioned above.

The nonconjugated polyene can be, for example, any of:

cyclic dienes such as 5-ethylidene-2-norbornene, 5-propylidene-5-norbornene, dicyclopentadiene, 5-vinyl-2-norbornene, 5-methylene-2-norbornene, 5-isopropylidene-2-norbornene and norbornadiene;

chain nonconjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene; and trienes such as 2,3-diisopropylidene-5-norbornene. Of these, 1,4-hexadiene, dicyclopentadiene and 5-ethylidene-2-norbornene are preferably used.

In the ethylene/α-olefin/nonconjugated polyene random copolymer (B-3), it is preferred that the molar ratio of ethylene/α-olefin/nonconjugated polyene be in the range of 90/5/5 to 30/45/25, especially 80/10/10 to 40/40/20.

The melt flow rate (MFR, measured at 230° C. under a load of 2.16 kg according to ASTM D 1238) of the ethylene/α-olefin/nonconjugated polyene random copolymer (B-3) is preferably 0.05 g/10 min or greater, still preferably in the range of 0.1 to 20 g/10 min.

As a specific example of the ethylene/α-olefin/nonconjugated polyene random copolymer (B-3), there can be mentioned ethylene/propylene/diene terpolymer (EPDM) or the like.

The above hydrogenated block copolymer (B-4) is a product of hydrogenation of block copolymer having a block form represented by the following formula (1) or (2), wherein the hydrogenation ratio is 90 mol % or more, preferably 95 mol % or more.

$$X(XY)n \qquad (1)$$

$$(XY)n \qquad (2)$$

wherein:

X represents a block polymer unit derived from a monovinyl substituted aromatic hydrocarbon, Y represents a block polymer unit derived from a conjugated diene, and n is an integer of 1 to 5.

The monovinyl substituted aromatic hydrocarbon for constituting the polymer block represented by X of the above formula (1) or (2) can be, for example, any of styrene and derivatives thereof, such as styrene, α-methylstyrene, p-methylstyrene, chlorostyrene, lower alkyl substituted styrenes and vinylnaphthalene. These can be used individually or in combination.

The conjugated diene for constituting the polymer block represented by Y of the above formula (1) or (2) can be, for example, any of butadiene, isoprene and chloroprene. These can be used individually or in combination. In the formulae, n is an integer of 1 to 5, preferably 1 or 2.

The hydrogenated block copolymer (B-4) can be, for example, a styrene block copolymer such as styrene/ethylene/butene/styrene block copolymer (SEBS), styrene/ethylene/propylene/styrene block copolymer (SEPS) or styrene/ethylene/propylene block copolymer (SEP).

The block copolymer before hydrogenation can be produced by, for example, a process wherein block copolymerization is carried out in the presence of a lithium catalyst or Ziegler catalyst in an inert solvent. With respect to details of this process, reference can be made to, for example, Japanese Patent Publication No. 40(1965)-23798.

Hydrogenation of the block copolymer can be performed in the presence of known hydrogenation catalyst in an inert solvent. With respect to details of this hydrogenation, reference can be made to, for example, Japanese Patent Publication Nos. 42(1967)-8704, 43(1968)-6636 and 46(1971)-20814.

When butadiene is used as the conjugated diene monomer, the proportion of 1,2-bond in polybutadiene block is preferably in the range of 20 to 80% by weight, still preferably 30 to 60% by weight.

Commercially available block copolymers can be used as the hydrogenated block copolymer (B-4). For example, use can be made of KRATON G1657 (trade name, produced by Shell Chemical Co., Ltd.), Septon2004 (trade name, produced by Kuraray Co., Ltd.), or Tuftec H1052 (trade name, produced by Asahi Chemical Co., Ltd.).

The above elastomers (B) can be used individually or in combination.

Inorganic Filler (C)

The inorganic filler (C) for use in the present invention can be, for example, any of talc, clay, calcium carbonate, mica, silicates, carbonates and glass fiber. Of these, talc and calcium carbonate are preferred. Talc is especially preferred. The average particle size of talc is preferably in the range of 1 to 5 µm, still preferably 1 to 3 µm. These inorganic fillers (C) can be used individually or in combination.

Polypropylene Resin Composition

The polypropylene resin composition containing the above propylene homopolymer (A1) comprises, based on the total weight of propylene homopolymer (A1), elastomer (B) and inorganic filler (C), 30 to 80% by weight, preferably 40 to 78% by weight, still preferably 42 to 75% by weight, and optimally 45 to 70% by weight of propylene homopolymer (A1); 15 to 40% by weight, preferably 15 to 35% by weight, still preferably 17 to 35% by weight, and optimally 20 to 35% by weight of elastomer (B); and 5 to 30% by weight, preferably 7 to 25% by weight, still preferably 8 to 23% by weight, and optimally 10 to 20% by weight of inorganic filler (C).

The polypropylene resin composition containing the above propylene block copolymer (A2) comprises, based on the total weight of propylene block copolymer (A2) and inorganic filler (C) or based on the total weight of propylene block copolymer (A2), elastomer (B) and inorganic filler (C), 30 to 80% by weight, preferably 40 to 78% by weight, still preferably 42 to 75% by weight, and optimally 45 to 70% by weight of propylene homopolymer segment of the propylene block copolymer (A2); 15 to 40% by weight, preferably 15 to 35% by weight, still preferably 17 to 35% by weight, and optimally 20 to 35% by weight of the sum of elastomer (B) and propylene/α-olefin random copolymer segment of the propylene block copolymer (A2); and 5 to 30% by weight, preferably 7 to 25% by weight, still preferably 8 to 23% by weight, and optimally 10 to 20% by weight of inorganic filler (C). It is preferred that, as aforementioned, the propylene/α-olefin random copolymer segment (component soluble in n-decane at room temperature) of the propylene block copolymer (A2) be contained in an amount of 1 to 40% by weight, especially 3 to 30% by weight, still especially 5 to 25% by weight, and yet still especially 5 to 15% by weight, based on the weight of propylene block copolymer (A2). The elastomer (B) is preferably contained in an amount of 0 to 39.7% by weight, still preferably 0 to 33.8% by weight, yet still preferably 0 to 32.9% by weight, and optimally 9.5 to 32.8% by weight, based on the total weight of propylene block copolymer (A2), elastomer (B) and inorganic filler (C).

In cross fractionating chromatography (CFC) of these polypropylene resin compositions, it is preferred that a 100 to 135° C. eluate with orthodichlorobenzene exhibit a ratio (Mw/Mn) of weight average molecular weight (Mw) to number average molecular weight (Mn) of 1 to 3, especially 1 to 2.5. When the ratio (Mw/Mn) falls within these ranges, the occurrence of flow marks can be prevented, and an injection molded article of excellent emboss transfer can be obtained. Further, the plasticization time can be shortened, so that the cooling time can be shortened to thereby enable shortening the molding cycle.

The polypropylene resin composition of the present invention obtained by mixing the above components (A), (B) and (C) at the above ratio of amount is excellent in fluidity at the time of molding and enables providing a molded article which is excellent in a balance of properties such as flexural modulus, impact resistance, hardness and brittle temperature. Accordingly, the polypropylene resin composition of the present invention can be appropriately used as a resin raw material for injection molding, enables preventing the occurrence of flow marks, and enables obtaining an injection molded article of excellent emboss transfer. Further, with respect to the polypropylene resin composition of the present invention, the plasticization time can be shortened, so that the cooling time can be shortened to thereby enable shortening the molding cycle.

The components of the polypropylene resin composition of the present invention are not limited to the above polypropylene resin (propylene homopolymer (A1) or propylene block copolymer (A2)), elastomer (B) and inorganic filler (C), and, according to necessity, the polypropylene resin composition can be incorporated with additives such as a thermal stabilizer, an antistatic agent, a weathering stabilizer, a light stabilizer, an age resister, an antioxidant, a metal salt of fatty acid, a softening agent, a dispersant, a filler, a colorant, a lubricant and a pigment in an amount not detrimental to the object of the present invention.

As the above antioxidant, there can be added any of conventional phenolic, sulfurous and phosphorous antioxidants.

The antioxidants can be used individually or in combination.

The amount of antioxidant to be incorporated is preferably in the range of 0.01 to 1 part by weight, still preferably 0.05 to 0.5 part by weight, per 100 parts by weight of the sum of polypropylene resin ((A1) or (A2)), elastomer (B) and inorganic filler (C).

As the light stabilizer, there can be mentioned, for example, a hindered amine light stabilizer (HALS) or an ultraviolet light absorber.

The hindered amine light stabilizer can be, for example, any of:

tetrakis(1,2,2,6,6-pentamethyl-4-piperidine)-1,2,3,4-butanetetracarboxylate (molecular weight=847), Adekastab LA-52 [molecular weight=847, tetrakis(1,2,2,6,6-pentamethyl-4-piperidine)-1,2,3,4-butanetetracarboxylate], Adekastab LA-62 (molecular weight=about 900), Adekastab LA-67 (molecular weight=about 900), Adekastab LA-63 (molecular weight=about 2000), Adekastab LA-68LD (molecular weight=about 1900), (all these Adekastabs are trade names for products of Asahi Denka Kogyo K.K.), and Chimassorb 944 (molecular weight=72,500, trade name, produced by Ciba Specialty Chemicals).

The ultraviolet light absorber can be, for example, any of Tinuvin 326 (molecular weight=316), Tinuvin 327 (molecular weight=357) and Tinuvin 120 (molecular weight=438) (all these Tinuvins are trade names for products of Ciba Specialty Chemicals).

These light stabilizers can be used individually or in combination.

The amount of hindered amine light stabilizer or ultraviolet light absorber to be incorporated is preferably in the range of 0.01 to 1 part by weight, still preferably 0.1 to 0.6 part by weight, per 100 parts by weight of the sum of polypropylene resin ((A1) or (A2)), elastomer (B) and inorganic filler (C).

The above metal salt of fatty acid functions as a neutralizer for the catalyst contained in the polypropylene resin composition and functions as a dispersant for the filler (including inorganic filler (C)), pigment, etc. compounded in the polypropylene resin composition. Thus, a molded article having excellent properties, for example, strength required for automobile inner trims can be produced from the polypropylene resin composition incorporated with the fatty acid metal salt.

The metal salt of fatty acid can be, for example, any of calcium stearate, magnesium stearate, lithium stearate and zinc stearate.

The amount of fatty acid metal salt to be incorporated is preferably in the range of 0.01 to 1 part by weight, still preferably 0.05 to 0.5 part by weight, per 100 parts by weight of the sum of polypropylene resin ((A1) or (A2)), elastomer (B) and inorganic filler (C). When the amount of fatty acid metal salt falls within the above ranges, not only can the fatty acid metal salt satisfactorily function as a neutralizer or dispersant but also the amount of sublimation from an molded article can be reduced.

Known pigments can be used as the above pigment, which include, for example, inorganic pigments such as metaloxides, sulfides and sulfates; and organic pigments such as phthalocyanine, quinacridone and benzidine pigments.

The amount of pigment to be incorporated is preferably in the range of 0.01 to 10 parts by weight, still preferably 0.05 to 5 parts by weight, per 100 parts by weight of the sum of polypropylene resin ((A1) or (A2)), elastomer (B) and inorganic filler (C).

The polypropylene resin composition for use in the present invention can be obtained by mixing or melt kneading the above polypropylene resin ((A1) or (A2)), elastomer (B) and inorganic filler (C) together with additives by the use of mixing equipments such as a Banbury mixer, a single screw extruder, a twin screw extruder or a high-speed twin screw extruder.

Automobile Part

The automobile part of the present invention is constituted of the thus obtained polypropylene resin composition.

When the automobile part of the present invention is an injection molded article, it is preferred that, at the measuring of glosses (reflectances) (angle of incidence: 90°, angle of reflection: 90° and area where measuring is performed: 4 mmϕ) of the surface of injection molded article at intervals of 5 mm in the direction of flow of the injection molded article, a reflectance difference (gloss difference) between neighboring measuring points satisfy the formula:

Δ reflectance difference≦0.5.

When the reflectance difference is 0.5 or less, it becomes difficult to visually inspect flow marks on the surface of injection molded article. That is, this injection molded article has excellent appearance and is suitable for use as an automobile part of commercial value. The method of measuring the reflectance difference (gloss difference) will be described later in the Example section.

EXAMPLES

The present invention will further be illustrated below with reference to the following Examples which in no way limit the scope of the invention.

Example A1

Synthesis of Metallocene Compound

Synthesis of dimethylmethylene(3-tert-butyl-5-methylcyclopentadienyl)(3,6-di-tert-butylfluorenyl)zirconium dichloride (1) Synthesis of 4,4'-di-t-butyldiphenylmethane A 300 ml two-necked flask was satisfactorily purged with nitrogen. 38.4 g (289 mmol) of $AlCl_3$ was placed in the flask, and 80 ml of $CH_3NO_2$ was added thereto to thereby dissolve the $AlCl_3$. Thus, solution (1) was obtained. A 500 ml three-necked flask equipped with a dropping funnel and a magnetic stirrer was satisfactorily purged with nitrogen. 25.6 g (152 mmol) of diphenylmethane and 43.8 g (199 mmol) of 2,6-di-t-butyl-4-methylphenol were placed in the flask, and 80 ml of $CH_3NO_2$ was added thereto to thereby dissolve them. The solution was cooled under agitation with the use of an ice bath, and the solution (1) was dropped thereinto over a period of 35 min. Thereafter, the reaction mixture was agitated at 12° C. for 1 hr. The resultant reaction mixture was poured into 500 ml of ice water, and the reaction product was extracted with 800 ml of hexane. The thus obtained organic layer containing the reaction product was washed with 600 ml of a 5% aqueous sodium hydroxide solution, and dried over $MgSO_4$. The $MgSO_4$ was filtered off, and the solvent was evaporated off. The thus obtained oil was cooled to −78° C. with the result that a solid was precipitated. The precipitated solid was recovered by filtration, and washed with 300 ml of ethanol. The washed solid was dried in vacuum. Thus, 4,4'-di-t-butyldiphenylmethane was obtained with a yield of 18.9 g.

(2) Synthesis of 2,2'-diiodo-4,4'-di-t-butyldiphenylmethane 1.95 g (6.96 mmol) of 4,4'-di-t-butyldiphenylmethane, 0.78 g (3.48 mmol) of $HIO_4$, 1.55 g (6.12 mmol) of $I_2$ and 0.48 ml of concentrated H₂SO₄ were charged into a 200 ml flask equipped with a magnetic stirrer. 17.5 ml of acetic acid and 3.75 ml of water were added to the contents of the flask, and heated at 90° C. under agitation. Thus, a reaction was conducted for 5 hr. The resultant reaction mixture was poured into 50 ml of ice water, and the reaction product was extracted with $(C_2H_5)_2O$. The thus obtained organic layer containing the reaction product was washed with 100 ml of a saturated aqueous solution of NaHSO₄. Na₂CO₃ was added to the washed organic layer and agitated, and the Na₂CO₃ was filtered off. The obtained organic layer was washed with 800 ml of water and dried over MgSO₄. The MgSO₄ was filtered off, and the solvent was distilled off. Thus, yellow oil was obtained. The yellow oil was purified by column chromatography. As a result, 2,2'-diiodo-4,4'-di-t-butyldiphenylmethane was obtained with a yield of 3.21 g.

(3) Synthesis of 3,6-di-t-butylfluorene 3.21 g (6.03 mmol) of 2,2'-diiodo-4,4'-di-t-butyldiphenylmethane and 2.89 g (47.0 mmol) of copper powder were charged into a 50 ml two-necked flask, and heated at 230° C. A reaction was conducted under agitation for 5 hr. The reaction product was extracted with acetone, and the solvent was distilled off. Thus, reddish-brown oil was obtained. Light-yellow oil was obtained from the reddish-brown oil by column chromatography. Fractions containing unreacted raw materials were once more applied to the column to thereby recover only the desired product. White solid of 3,6-di-t-butylfluorene was obtained by recrystallization with methanol. The yield was 1.08 g.

(4) Synthesis of 1-tert-butyl-3-methylcyclopentadiene

In a nitrogen atmosphere, dehydrated diethylether (350 ml) was added to a tert-butylmagnesium chloride/diethyl ether solution of 2.0 mol/lit. concentration (450 ml, 0.90 mol) to thereby obtain a solution. A solution of 3-methylcyclopentenone (43.7 g, 0.45 mmol) in dehydrated diethyl ether (150 ml) was dropped into the above solution while maintaining its temperature at 0° C. by cooling with ice. The mixture was agitated at room temperature for 15 hr. A solution of ammonium chloride (80.0 g, 1.50 mol) in water (350 ml) was dropped into the reaction mixture while maintaining its temperature at 0° C. by cooling with ice. Water (2500 ml) was added to the obtained solution, and agitated. An organic layer containing the reaction product was separated and washed with water. A 10% aqueous hydrochloric acid solution (82 ml) was added to the organic layer while maintaining its temperature at 0° C. by cooling with ice, and agitated at room temperature for 6 hr. The organic layer of the reaction mixture was separated, washed with water, a saturated aqueous solution of sodium hydrogencarbonate, water and a saturated aqueous solution of sodium chloride in sequence, and dried over anhydrous magnesium sulfate (drier). The drier was filtered off, and the solvent was distilled off from the filtrate. Thus, a liquid was obtained. 14.6 g of light-yellow liquid (1-tert-butyl-3-methylcyclopentadiene) was obtained by vacuum distillation (45 to 47° C./10 mmHg) of the above liquid. The analytical value thereof was as follows:

¹H-NMR (at 270 MHz in CDCl₃ with reference of TMS) δ6.31+6.13+5.94+5.87 (s+s+t+d, 2H), 3.04+2.95 (s+s, 2H), 2.17+2.09 (s+s, 3H), 1.27 (d, 9H)

(5) Synthesis of 3-tert-butyl-5,6,6-trimethylfulvene

In a nitrogen atmosphere, dehydrated acetone (55.2 g, 950.4 mmol) was dropped into a solution of 1-tert-butyl-3-methylcyclopentadiene (13.0 g, 95.6 mmol) in dehydrated methanol (130 ml) while maintaining its temperature at 0° C. by cooling with ice. Further, pyrrolidine (68.0 g, 956.1 mmol) was dropped thereinto, and agitated at room temperature for 4 days. The obtained reaction mixture was diluted with diethyl ether (400 ml), and 400 ml of water was added. An organic layer containing the reaction product was separated and washed with a 0.5 N aqueous hydrochloric acid solution (150 ml×4), water (200 ml×3) and a saturated aqueous solution of sodium chloride (150 ml) in sequence. The washed organic layer was dried over anhydrous magnesium sulfate (drier). The drier was filtered off, and the solvent was distilled off from the filtrate. Thus, a liquid was obtained. 10.5 g of yellow liquid (3-tert-butyl-5,6,6-trimethylfulvene) was obtained by vacuum distillation (70 to 80° C./0.1 mmHg) of the above liquid. The analytical value thereof was as follows:

¹H-NMR (at 270 MHz in CDCl₃ with reference of TMS) δ6.23 (s, 1H), 6.05 (d, 1H), 2.23 (s, 3H), 2.17 (d, 6H), 1.17 (s, 9H).

(6) Synthesis of 2-(3-tert-butyl-5-methylcyclopentadienyl)-2-(3,6-di-tert-butylfluorenyl)propane In a nitrogen atmosphere, while cooling with ice, a hexane solution of n-butyllithium (2.1 ml, 3.4 mmol) was dropped into a solution of 3,6-di-tert-butylfluorene (0.9 g, 3.4 mmol) in THF (30 ml), and agitated at room temperature for 6 hr to thereby obtain a red solution. Further, while cooling with ice, a solution of 3-tert-butyl-5,6,6-trimethylfulvene (0.6 g, 3.5 mmol) in THF (15 ml) was dropped into the red solution in a nitrogen atmosphere. The mixture was agitated at room temperature for 12 hr, and 30 ml of water was added thereto. An organic layer containing the reaction product was separated by extraction with diethyl ether and dried over magnesium sulfate. Filtration was conducted, and the solvent was removed from the filtrate in vacuum. Thus, a solid was obtained. This solid was subjected to recrystallization from hot methanol, thereby obtaining 1.2 g of light-yellow solid (2-(3-tert-butyl-5-methylcyclopentadienyl)-2-(3,6-di-tert-butylfluorenyl)propane). The analytical value there of was as follows:

¹H-NMR (at 270 MHz in CDCl₃ with reference of TMS) δ7.72 (d, 2H), 7.18-7.05 (m, 4H), 6.18-5.99 (s+s, 1H), 4.32-4.18 (s+s, 1H), 3.00-2.90 (s+s, 2H), 2.13-1.98 (t+s, 3H), 1.38 (s, 18H), 1.19 (s, 9H), 1.10 (d, 6H).

(7) Synthesis of dimethylmethylene(3-tert-butyl-5-methylcyclopentadienyl)(3,6-di-tert-butylfluorenyl) zirconium dichloride While cooling with ice, a hexane solution of n-butyllithium (3.6 ml, 5.8 mmol) was dropped into a solution of 2-(3-tert-butyl-5-methylcyclopentadienyl)-2-(3,6-di-tert-butylfluorenyl)propane (1.3 g, 2.8 mmol) in diethyl ether (40 ml) in a nitrogen atmosphere, and agitated at room temperature for 16 hr. The solvent was removed from the reaction mixture in vacuum, thereby obtaining a reddish-orange solid. 150 ml of dichloromethane was added to the solid at −78° C. and agitated to thereby dissolve the solid. Subsequently, the obtained solution was added to a suspension of zirconium tetrachloride (THF) biscomplex (1.0 g, 2.7 mmol) in dichloromethane (10 ml) having been cooled to −78° C., agitated at −78° C. for 6 hr, and at room temperature for 24 hr. The solvent was removed from the reaction mixture in vacuum, thereby obtaining an orange solid. This solid was subjected to extraction with toluene, Celite filtration, removal of the solvent from the filtrate in vacuum, and recrystallization from diethyl ether. Thus, there was obtained 0.18 g of orange solid (dimethylm-ethylene(3-tert-butyl-5-methylcyclopentadieny 1)(3,6-di-tert-butylfluorenyl)zirconium dichloride). The analytical value thereof was as follows:

$^1$H-NMR (at 270 MHz in CDCl$_3$ with reference of TMS) δ7.98 (dd, 2H), 7.90 (d, 1H), 7.69 (d, 1H), 7.32-7.25 (m, 2H), 6.01 (d, 1H), 5.66 (d, 1H), 2.54 (s, 3H), 2.36 (s, 3H), 2.28 (s, 1H), 1.43 (d, 18H), 1.08 (s, 9H)

[Preparation of Methylaluminoxane Supported on Silica]

20 g of silica (trade name H-121, produced by Asahi Glass Co., Ltd., dried at 150° C. in nitrogen for 4 hr) and 200 ml of toluene were charged in a 500 ml reactor having satisfactorily been purged with nitrogen. Under agitation, 60 ml of methylaluminoxane (produced by Albemarle Corporation, 10% by weight toluene solution) was dropped thereinto in a nitrogen atmosphere. Subsequently, this mixture was reacted at 110° C. for 4 hr. The reaction system was allowed to cool to thereby precipitate a sold component. The supernatant solution was removed by decantation. Thereafter, the solid component was washed with toluene three times and with hexane three times. As a result, methylaluminoxane supported on silica was obtained.

[Production of Propylene Homopolymer (A1-1)]

20 mmol, in terms of aluminum, of methylaluminoxane supported on silica was charged in a 1000 ml two-necked flask having satisfactorily been purged with nitrogen, and suspended in 500 ml of heptane. A toluene solution of 54 mg (0.088 mmol) of dimethylmethylene(3-tert-butyl-5-methyl-cyclopentadienyl)(3,6-di-tert-butylfluorenyl)zirconium dichloride was added to the suspension. Subsequently, tri-isobutylaluminum (80 mmol) was added thereto, and agitated for 30 min to thereby obtain a catalyst suspension.

This catalyst suspension was charged in an autoclave of 200 lit. internal volume having satisfactorily been purged with nitrogen. 40 kg of liquid propylene and 30 N lit. of hydrogen were charged thereinto, and a polymerization was effected at 70° C. under a pressure of 3.0 to 3.5 MPa for 60 min. Upon the completion of polymerization, methanol was added thereto to thereby terminate the polymerization. Unreacted propylene was purged off, thereby obtaining propylene homopolymer (A1-1). The propylene homopolymer (A1-1) was dried at 80° C. in vacuum for 6 hr. The yield of propylene homopolymer (A1-1) after drying was 17 kg.

The thus obtained propylene homopolymer (A1-1) had a melting point (Tm) of 158° C., an MFR (measured at 230° C. under a load of 2.16 kg according to ASTM D 1238) of 42 g/10 min, a weight average molecular weight (Mw) of 140,000, a number average molecular weight (Mn) of 70,000, a ratio of Mw/Mn of 2.0 and an n-decane soluble content of 0.2% by weight. With respect to the stereo regularity of the propylene homopolymer (A1-1), the mmmm fraction was 95.8%, and neither 2,1-insertion nor 1,3-insertion was detected.

[Production of Polypropylene Resin Composition]

The thus obtained propylene homopolymer (A1-1), propylene/ethylene copolymer rubber (B-1) [PER; ethylene content=41 mol % and MFR (measured at 230° C. under a load of 2.16 kg according to ASTM D 1238)=2.0 g/10 min], ethylene/1-butene copolymer rubber (B-2-a) [EBR; ethylene content=82 mol % and MFR (measured at 230° C. under a load of 2.16 kg according to ASTM D 1238)=7 g/10 min], talc (C-1) [inorganic filler, tradename K-1, produced by Hayashi Kasei], Irganox 1010 (trade name) [antioxidant, produced by Ciba Geigy], Irgafos 168 (trade name) [antioxidant, produced by Ciba Geigy], Sanol LS-770 (trade name) [HALS light stabilizer, produced by Sankyo Co., Ltd.] and Tinuvin 120 (trade name) [ultraviolet light absorber, produced by Ciba Geigy] were blended together in proportions specified in Table 1 by means of a tumbler mixer. The blend was melt kneaded and pelletized by means of a twin screw extruder.

An injection molding of the thus obtained polypropylene resin composition into a plate (100 mm×350 mm×2 mm thick) was carried out by means of injection molding machine [model M-200AII-SJ-MJ, manufactured by Meiki Sei-sakusho]. On the plate, flow marks were visually inspected. The plate was evaluated as "o" when flow marks were scarcely noticed, as "Δ" when flow marks were easily noticed, and as "x" when flow marks were highly conspicuous.

Further, using the same injection molding machine and the same metal mold, the plasticization time was measured by setting the screw back pressure for 700 kg/cm$^2$.

Still further, using the same injection molding machine, a plate with its surface embossed (140 mm×360 mm×3 mm thick) was injection molded. The gloss of the surface having undergone emboss transfer was measured (the gloss of embossed surface was measured in accordance with ASTM D523 wherein the angle of light incidence was 60°). The gloss was measured at two positions, namely, position (site A) spaced by 80 mm from an end upstream of the plate center and position (site B) spaced by 80 mm from an end downstream of the plate center.

Still further, ASTM test pieces were injection molded by means of injection molding machine (model NN220a manufactured by Niigata Seikosho), and various properties were measured. Moreover, the polypropylene resin composition was injection molded, and the occurrence of flow marks was inspected by measuring the gloss difference (reflectance difference) on the surface of injection molded piece. The results are listed in Table 1.

The properties were measured in the following manners.

[Tensile Properties]

With respect to the tensile properties, a tensile test was performed in accordance with ASTM D638-84. Tensile elongation was measured under the following conditions.

<Testing Conditions>
  test piece: No. 1 dumbbell specified in ASTM D638-84,
  chuck distance: 114 mm,
  temperature: 23° C., and
  rate of pulling: 10 mm/min and 20 mm/min.

[Flexural Properties]

With respect to the flexural properties, the flexural modulus was measured by performing a flexural test in accordance with ASTM D790 under the following conditions.

<Testing Conditions>
  test piece: 6.4 mm (thickness)×12.7 mm (width)×127 mm (length),
  span: 100 mm,
  rate of flexing: 2 mm/min, and
  measuring temperature: 23° C.

[Izod Impact Strength]

The Izod impact strength was measured by performing an impact test in accordance with ASTM D256 under the following conditions.

<Testing Conditions> test piece: 12.7 mm (width)×6.4 mm (thickness)×64 mm (length), notch: machining, and measuring temperature: 23° C. and −30° C.

The injection molding conditions for obtaining test pieces used in the flow mark inspection, emboss transfer evaluation, plasticization time measuring and ASTM tests were as follows:

<Injection Molding Conditions>

Flow Mark Inspection:

resin temperature 230° C., metal mold temperature 40° C., rate of injection 25%, injection pressure 65%, and cooling time 20 sec;

Emboss Transfer Evaluation:

resin temperature 220° C., metal mold temperature 40° C., rate of injection 20%, injection pressure 80%, and cooling time 15 sec;

Plasticization Time Measuring:

resin temperature 210° C., metal mold temperature 40° C., rate of injection 30%, injection pressure 50%, and cooling time 20 sec; and ASTM Tests:

resin temperature 210° C., metal mold temperature 40° C., rate of injection 40%, injection pressure 40%, and cooling time 20 sec.

[Reflectance Test]

On an injection molded plate (100 mm×350 mm×2 mm thick, one gate), the reflectances (meter: model FW-098 manufactured by Nippon Denshoku Kogyo Co., Ltd., angle of incidence: 90°) were measured at intervals of 5 mm in the direction of injection flow over a length of 50 to 150 mm from the flow end.

Example A2

A polypropylene resin composition was produced in the same manner as in Example A1 except that the blending proportions of propylene homopolymer (A1-1), propylene/ethylene copolymer rubber (B-1), ethylene/1-butene copolymer rubber (B-2-a) and talc (C-1) and the types and blending proportions of additives were changed as specified in Table 2. The obtained polypropylene resin composition was evaluated in the same manner as in Example A1. The results are listed in Table 2.

Comparative Example A1

Synthesis of Metallocene Compound

Synthesis of dimethylsilylenebis(2-methyl-4-phenyl-indenyl)zirconium dichloride

Dimethylsilylenebis(2-methyl-4-phenylindenyl)zirconium dichloride was synthesized in the manner described in Organometallics, 13, 954 (1994).

[Production of Propylene Homopolymer (A1-2)]

Propylene homopolymer (A1-2) was produced in the same manner as in Example A1 except that 70 mg of dimethylsilylenebis(2-methyl-4-phenylindenyl)zirconium dichloride was used as the metallocene compound.

The yield of propylene homopolymer (A1-2) was 16.3 kg. This propylene homopolymer (A1-2) had a melting point (Tm) of 150° C., an MFR (measured at 230° C. under a load of 2.16 kg according to ASTM D 1238) of 40 g/10 min, a ratio of Mw/Mn of 2.3 and a room temperature n-decane soluble content of 0.6% by weight. With respect to the stereoregularity of the propylene homopolymer (A1-2), the mmmm fraction was 95.7%, and the proportions of 2,1-insertion and 1,3-insertion were 0.80% and 0.05%, respectively. The proportion of 2,1-insertion was greater than the proportion of 1,3-insertion.

A polypropylene resin composition was produced from the obtained propylene homopolymer (A1-2) in the same manner as in Example A1. The properties thereof were evaluated, and the results are listed in Table 1.

Comparative Example A2

A polypropylene resin composition was produced from the same propylene homopolymer (A1-2) as used in Comparative Example A1 in the same manner as in Example A2. The properties thereof were evaluated, and the results are listed in Table 2.

Comparative Example A3

The properties of commercially available propylene homopolymer (A1-3) [trade name J108, produced by Grand Polymer] produced in the presence of titanium supported on magnesium chloride catalyst (Ziegler Natta catalyst) for use in this Comparative Example A3 were as follows.

The propylene homopolymer (A1-3) had a melting point (Tm) of 160° C., an MFR (measured at 230° C. under a load of 2.16 kg according to ASTM D 1238) of 40 g/10 min, a ratio of Mw/Mn of 4.4 and a room temperature n-decane soluble content of 2.0% by weight. The value of Mw/Mn ratio was large. With respect to the stereo regularity of the propylene homopolymer (A1-3), the mmmm fraction was 96.5%, and neither 2,1-insertion nor 1,3-insertion was detected.

A polypropylene resin composition was produced from the propylene homopolymer (A1-3) in the same manner as in Example A1. The properties thereof were evaluated, and the results are listed in Table 1.

Comparative Example A4

A polypropylene resin composition was produced from the same propylene homopolymer (A1-3) as used in Comparative Example A3 in the same manner as in Example A2. The properties thereof were evaluated, and the results are listed in Table 2.

TABLE 1

|  |  | Example A1 | Comp. Ex. A1 | Comp. Ex. A3 |
|---|---|---|---|---|
| Constitution of polypropylene resin composition propylene homopolymer |  |  |  |  |
| (A1-1) | [wt %] | 51.1 | — | — |
| (A1-2) | [wt %] | — | 51.1 | — |
| (A1-3) | [wt %] | — | — | 51.1 |
| PER (B-1) | [wt %] | 9.6 | 9.6 | 9.6 |
| EBR (B-2-a) | [wt %] | 29.0 | 29.0 | 29.0 |
| talc (C-1) | [wt %] | 10.3 | 10.3 | 10.3 |
| Irganox 1010 | [phr] | 0.10 | 0.10 | 0.10 |
| Irgafos 168 | [phr] | 0.10 | 0.10 | 0.10 |
| calcium stearate | [phr] | 0.10 | 0.10 | 0.10 |
| Sanol LS-770 | [phr] | 0.10 | 0.10 | 0.10 |
| Tinuvin 120 | [phr] | 0.35 | 0.35 | 0.35 |
| Property evaluation result |  |  |  |  |
| melt flow rate | [g/10 min] | 25 | 25 | 25 |
| tensile elongation | [%] | 500< | 500< | 500< |
| flexural modulus | [MPa] | 1160 | 960 | 1170 |
| Izod impact strength (23° C.) | [J/m] | 650 | 650 | 620 |
| Izod impact strength (−30° C.) | [J/m] | 140 | 140 | 110 |
| degree of conspicuousness of flow marks (visual inspection) |  | ○ | ○ | Δ |
| gloss of embossed part (site A) | [%] | 2.2 | 2.2 | 2.9 |
| gloss of embossed part (site B) | [%] | 2.3 | 2.4 | 3.6 |
| plasticization time | [sec] | 11 | 11 | 15 |
| Mw/Mn of CFC (100 to 135° C.) eluate |  | 2.2 | 2.0 | 5.7 |

|  |  | Example A1 | | Comp. Ex. A1 | | Comp. Ex. A2 | |
|---|---|---|---|---|---|---|---|
| No. | Distance from flow end (mm) | reflectance | reflectance diff. | reflectance | reflectance diff. | reflectance | reflectance diff. |
| 1 | 150 | 32.81 | — | 33.10 | — | 33.53 | — |
| 2 | 145 | 33.00 | 0.19 | 32.99 | 0.11 | 32.91 | 0.62 |
| 3 | 140 | 32.88 | 0.12 | 33.01 | 0.02 | 32.45 | 0.46 |
| 4 | 135 | 33.06 | 0.18 | 32.94 | 0.07 | 33.04 | 0.59 |
| 5 | 130 | 32.90 | 0.16 | 33.08 | 0.14 | 33.55 | 0.51 |
| 6 | 125 | 33.03 | 0.13 | 32.91 | 0.17 | 32.88 | 0.67 |
| 7 | 120 | 32.95 | 0.08 | 33.04 | 0.13 | 32.43 | 0.45 |
| 8 | 115 | 33.10 | 0.15 | 32.99 | 0.05 | 33.03 | 0.60 |
| 9 | 110 | 32.99 | 0.11 | 32.88 | 0.11 | 33.65 | 0.62 |
| 10 | 105 | 32.91 | 0.08 | 33.08 | 0.20 | 33.18 | 0.47 |
| 11 | 100 | 33.04 | 0.13 | 33.12 | 0.04 | 32.77 | 0.41 |
| 12 | 95 | 32.97 | 0.07 | 32.95 | 0.17 | 32.52 | 0.25 |
| 13 | 90 | 33.11 | 0.14 | 33.01 | 0.06 | 33.07 | 0.55 |
| 14 | 85 | 32.91 | 0.20 | 32.87 | 0.14 | 33.45 | 0.38 |
| 15 | 80 | 33.00 | 0.09 | 33.04 | 0.17 | 32.88 | 0.57 |
| 16 | 75 | 32.85 | 0.15 | 32.83 | 0.21 | 32.48 | 0.40 |
| 17 | 70 | 33.01 | 0.16 | 33.01 | 0.18 | 33.00 | 0.52 |
| 18 | 65 | 33.04 | 0.03 | 32.91 | 0.10 | 33.55 | 0.55 |
| 19 | 60 | 32.87 | 0.17 | 33.07 | 0.16 | 33.08 | 0.47 |
| 20 | 55 | 33.06 | 0.19 | 32.89 | 0.18 | 32.65 | 0.43 |
| 21 | 50 | 32.93 | 0.13 | 33.10 | 0.21 | 33.07 | 0.42 |

(Note)
Unit of amount of additive: phr based on the total weight of propylene homopolymer, talc, PER and EBR.

TABLE 2

|  |  | Example A2 | Comp. Ex. A2 | Comp. Ex. A4 |
|---|---|---|---|---|
| Constitution of polypropylene resin composition propylene homopolymer |  |  |  |  |
| (A1-1) | [wt %] | 54.3 | — | — |
| (A1-2) | [wt %] | — | 54.3 | — |
| (A1-3) | [wt %] | — | — | 54.3 |
| PER (B-1) | [wt %] | 7.1 | 7.1 | 7.1 |
| EBR (B-2-a) | [wt %] | 20.2 | 20.2 | 20.2 |
| talc (C-1) | [wt %] | 18.4 | 18.4 | 18.4 |
| Irganox 1010 | [phr] | 0.10 | 0.10 | 0.10 |
| Irgafos 168 | [phr] | 0.10 | 0.10 | 0.10 |
| calcium stearate | [phr] | 0.10 | 0.10 | 0.10 |

TABLE 2-continued

|  |  | Example A2 | Comp. Ex. A2 | Comp. Ex. A4 |
|---|---|---|---|---|
| Sanol LS-770 | [phr] | 0.15 | 0.15 | 0.15 |
| Chimassorb 944 | [phr] | 0.15 | 0.15 | 0.15 |
| Property evaluation result |  |  |  |  |
| melt flow rate | [g/10 min] | 31 | 30 | 28 |
| tensile elongation | [%] | 500< | 500< | 500< |
| flexural modulus | [MPa] | 2030 | 1780 | 2030 |
| Izod impact strength (23° C.) | [J/m] | 320 | 300 | 280 |
| Izod impact strength (−30° C.) | [J/m] | 32 | 30 | 29 |
| degree of conspicuousness of flow marks (visual inspection) |  | ○ | ○ | Δ |
| gloss of embossed part (site A) | [%] | 2.5 | 2.6 | 2.9 |
| gloss of embossed part (site B) | [%] | 2.4 | 2.5 | 3.1 |
| plasticization time | [sec] | 12 | 12 | 16 |
| Mw/Mn of CFC (100 to 135° C.) eluate |  | 2.2 | 2.1 | 5.8 |

(Note)
Unit of amount of additive: phr based on the total weight of propylene homopolymer, talc, PER and EBR.

Example B1

Production of Propylene Block Copolymer (A2-1)

20 mmol, in terms of aluminum, of methylaluminoxane supported on silica as described in Example A1 was charged in a 1000 ml two-necked flask having satisfactorily been purged with nitrogen, and suspended in 500 ml of heptane. A toluene solution of 54 mg (0.088 mmol) of dimethylmethylene(3-tert-butyl-5-methylcyclopentadienyl)(3,6-di-tert-butylfluorenyl)zirconium dichloride as described in Example A1 was added to the suspension. Subsequently, triisobutylaluminum (80 mmol) was added thereto, and agitated for 30 min to thereby obtain a catalyst suspension.

5 kg of propylene and 3 lit. of hydrogen were charged in an autoclave of 20 lit. internal volume having satisfactorily been purged with nitrogen. The above catalyst suspension was added thereto, and a bulk homopolymerization was effected at 70° C. under a pressure of 3.0 to 3.5 MPa for 40 min.

Upon the completion of homopolymerization, the vent valve was opened, thereby reducing the pressure of unreacted propylene until the internal pressure of the polymerization reactor became equal to atmospheric pressure. Immediately upon the completion of pressure reduction, a copolymerization of ethylene and propylene was carried out. Specifically, a mixture of ethylene and propylene gases (25 mol % ethylene and 75 mol % propylene) was continuously fed into the polymerization reactor while regulating the openness of the vent of the polymerization reactor so that to the internal pressure of the polymerization reactor became 1 MPa. Polymerization was effected at 70° C. for 60 min. A small amount of methanol was added thereto to thereby terminate the polymerization. Unreacted gas was purged off from the polymerization reactor.

The yield of propylene block copolymer (A2-1) was 2.9 kg. This propylene block copolymer (A2-1) exhibited an MFR (measured at 230° C. under a load of 2.16 kg according to ASTM D1238) of 31 g/10 min and a room temperature n-decane soluble content (content of propylene/ethylene random copolymer segment) of 11% by weight. With respect to the room temperature n-decane soluble component, the intrinsic viscosity [η] measured in 135° C. decalin was 2.2 dl/g, and the ethylene content was 41 mol %.

The propylene homopolymer segment of the propylene block copolymer (A2-1) had a melting point (Tm) of 158° C., an MFR (measured at 230° C. under a load of 2.16 kg according to ASTM D 1238) of 42 g/10 min, a weight average molecular weight (Mw) of 140,000, a number average molecular weight (Mn) of 70,000, a ratio of Mw/Mn of 2.0 and a n-decane soluble content of 0.2% by weight. With respect to the stereo regularity of the propylene homopolymer segment, the mmmm fraction was 95.8%, and neither 2,1-insertion nor 1,3-insertion was detected.

The amount, composition, molecular weight, stereo regularity, etc. of polymer obtained at each stage were identified in the following manner. First, the propylene block copolymer (A2-1) was treated with 150° C. n-decane for 2 hr, and cooled to room temperature. The thus precipitated solid component was separated by filtration. The obtained solid component was regarded as the propylene homopolymer produced in the first stage. Further, the component obtained by concentrating the filtrate in vacuum and drying the concentrate was regarded as the n-decane soluble component. With respect to the thus obtained components, various analyses were performed in accordance with customary methods.

[Production of Polypropylene Resin Composition]

The thus obtained propylene block copolymer (A2-1), ethylene/1-butene copolymer rubber (B-2-b) [EBR; ethylene content=70 mol % and MFR (measured at 230° C. under a load of 2.16 kg according to ASTM D 1238)=1.8 g/10 min], talc (C-1) [inorganic filler, trade name K-1, produced by Hayashi Kasei], Irganox 1010 (trade name) [antioxidant, produced by Ciba Geigy], Irgafos 168 (trade name) [antioxidant, produced by Ciba Geigy], Sanol LS-770 (trade name) [HALS light stabilizer, produced by Sankyo Co., Ltd.] and Tinuvin 120 (trade name) [ultraviolet light absorber, produced by Ciba Geigy] were blended together in proportions specified in Table 3 by means of a tumbler mixer. The blend was melt kneaded and pelletized by means of a twin screw extruder.

An injection molding of the thus obtained polypropylene resin composition into a plate (100 mm×350 mm×2 mm thick) was carried out by means of injection molding machine [model M-200AII-SJ-MJ, manufactured by Meiki Seisakusho]. On the plate, flow marks were visually inspected.

Further, using the same injection molding machine and the same metal mold, the plasticization time was measured by setting the screw back pressure for 700 kg/cm².

Still further, using the same injection molding machine, a plate with its surface embossed (140 mm×360 mm×3 mm thick) was injection molded. The gloss of the surface having undergone emboss transfer was measured. The gloss of embossed surface was measured in accordance with ASTM D523 wherein the angle of light incidence was 60°. The gloss was measured at two positions, namely, position (site A) spaced by 80 mm from an end upstream of the plate center and position (site B) spaced by 80 mm from an end downstream of the plate center.

Still further, ASTM test pieces were injection molded by means of injection molding machine (model NN220a manufactured by Niigata Seikosho), and various properties were measured. The results are listed in Table 3.

The methods of measuring tensile properties, flexural properties and Izod impact strength were as described in Example A1.

Also, the injection molding conditions for flow mark inspection, emboss transfer evaluation, plasticization time measuring and ASTM testing test pieces were as described in Example A1.

Example B2

A polypropylene resin composition was produced in the same manner as in. Example B1 except that the blending proportions of propylene block copolymer (A2-1), ethylene/1-butene copolymer rubber (B-2-b) and talc (C-1) and the types and blending proportions of additives were changed as specified in Table 4. The obtained polypropylene resin composition was evaluated in the same manner as in Example B1. The results are listed in Table 4.

Comparative Example B1

Production of Propylene Block Copolymer (A2-2)

Propylene block copolymer (A2-2) was produced in the same manner as in Example B1 except that 70 mg of dimethylsilylenebis(2-methyl-4-phenylindenyl)zirconium dichloride as described in Example A1 was used as the metallocene compound.

The thus obtained propylene block copolymer (A2-2) exhibited an MFR (measured at 230° C. under a load of 2.16 kg according to ASTM D 1238) of 30 g/10 min and a room temperature n-decane soluble content (content of propylene/ethylene random copolymer segment) of 11.0% by weight. With respect to the room temperature n-decane soluble component, the intrinsic viscosity [η] measured in 135° C. decalin was 2.2 dl/g, and the ethylene content was 41 mol %.

The propylene homopolymer segment of the propylene block copolymer (A2-2) had a melting point (Tm) of 150° C., an MFR (measured at 230° C. under a load of 2.16 kg according to ASTM D 1238) of 40 g/10 min, a weight average molecular weight (Mw) of 141,000, a number average molecular weight (Mn) of 60,000, a ratio of Mw/Mn of 2.3 and an-decane soluble content of 0.6% by weight. With respect to the stereo regularity of the propylene homopolymer segment, the mmmm fraction was 95.9%, and the proportions of 2,1-insertion and 1,3-insertion were 0.80% and 0.05%, respectively.

Production of Polypropylene Resin Composition

A polypropylene resin composition was produced from the obtained propylene block copolymer (A2-2) in the same manner as in Example B1. The properties thereof were evaluated, and the results are listed in Table 3.

Comparative Example B2

A polypropylene resin composition was produced from the same propylene block copolymer (A2-2) as used in Comparative Example B1 in the same manner as in Example B2. The properties thereof were evaluated, and the results are listed in Table 4.

Comparative Example B3

The properties of commercially available propylene/ethylene block copolymer (A2-3) [trade name J707, produced by Grand Polymer] produced in the presence of titanium supported on magnesium chloride catalyst (Ziegler Natta catalyst) for use in this Comparative Example B3 were as follows.

The propylene/ethylene block copolymer (A2-3) exhibited an MFR (measured at 230° C. under a load of 2.16 kg according to ASTM D 1238) of 27 g/10 min and a room temperature n-decane soluble content (content of propylene/ethylene random copolymer segment) of 11.5% by weight. With respect to the room temperature n-decane soluble component, the intrinsic viscosity [η] measured in 135° C. decalin was 2.8 dl/g, and the ethylene content was 41 mol %.

The propylene homopolymer segment of the propylene/ethylene block copolymer (A2-3) had a melting point (Tm) of 160° C., an MFR (measured at 230° C. under a load of 2.16 kg according to ASTM D 1238) of 40 g/10 min and a ratio of Mw/Mn of 4.4. With respect to the stereo regularity of the polymer of decane insoluble component, the mmmm fraction was 96.5%, and neither 2,1-insertion nor 1,3-insertion was detected.

A polypropylene resin composition was produced from the propylene block copolymer (A2-3) in the same manner as in Example B1. The properties thereof were evaluated and the results are listed in Table 3.

Comparative Example B4

A polypropylene resin composition was produced from the same propylene block copolymer (A2-3) as used in Comparative Example B3 in the same manner as in Example B2. The properties thereof were evaluated, and the results are listed in Table 4.

TABLE 3

|  |  | Example B1 | Comp. Ex. B1 | Comp. Ex. B3 |
| --- | --- | --- | --- | --- |
| Constitution of polypropylene resin composition propylene block copolymer |  |  |  |  |
| (A2-1) | [wt %] | 62 | — | — |
| (A2-2) | [wt %] | — | 62 | — |
| (A2-3) | [wt %] | — | — | 62 |
| EBR (B-2-b) | [wt %] | 27 | 27 | 27 |
| talc (C-1) | [wt %] | 11 | 11 | 11 |
| Irganox 1010 | [phr] | 0.10 | 0.10 | 0.10 |
| Irgafos 168 | [phr] | 0.10 | 0.10 | 0.10 |

TABLE 3-continued

|  |  | Example B1 | Comp. Ex. B1 | Comp. Ex. B3 |
|---|---|---|---|---|
| calcium stearate | [phr] | 0.10 | 0.10 | 0.10 |
| Sanol LS-770 | [phr] | 0.10 | 0.10 | 0.10 |
| Tinuvin 120 | [phr] | 0.35 | 0.35 | 0.35 |
| Property evaluation result |  |  |  |  |
| melt flow rate | [g/10 min] | 25 | 24 | 23 |
| tensile elongation | [%] | 500< | 500< | 500< |
| flexural modulus | [MPa] | 1150 | 950 | 1160 |
| Izod impact strength (23° C.) | [J/m] | 650 | 650 | 590 |
| Izod impact strength (−30° C.) | [J/m] | 150 | 140 | 110 |
| degree of conspicuousness of flow marks (visual inspection) |  | ○ | ○ | Δ |
| gloss of embossed part (site A) | [%] | 2.2 | 2.2 | 2.5 |
| gloss of embossed part (site B) | [%] | 2.3 | 2.4 | 3.2 |
| plasticization time | [sec] | 11 | 11 | 16 |
| Mw/Mn of CFC (100 to 135° C.) eluate |  | 2.1 | 2.1 | 5.6 |

(Note 1) The contents of propylene/ethylene random copolymer segment in propylene block copolymers (A2-1), (A2-2) and (A2-3) were 6.82 wt %, 6.82 wt % and 7.13 wt %, respectively.
(Note 2) Unit of amount of additive: phr based on the total weight of propylene block copolymer, talc and EBR.

TABLE 4

|  |  | Example B2 | Comp. Ex. B2 | Comp. Ex. B4 |
|---|---|---|---|---|
| Constitution of polypropylene resin composition propylene block copolymer |  |  |  |  |
| (A2-1) | [wt %] | 65 | — | — |
| (A2-2) | [wt %] | — | 65 | — |
| (A2-3) | [wt %] | — | — | 65 |
| EBR (B-2-b) | [wt %] | 15 | 15 | 15 |
| talc (C-1) | [wt %] | 20 | 20 | 20 |
| Irganox 1010 | [phr] | 0.10 | 0.10 | 0.10 |
| Irgafos 168 | [phr] | 0.10 | 0.10 | 0.10 |
| calcium stearate | [phr] | 0.10 | 0.10 | 0.10 |
| Sanol LS-770 | [phr] | 0.15 | 0.15 | 0.15 |
| Chimassorb 944 | [phr] | 0.15 | 0.15 | 0.15 |
| Property evaluation result |  |  |  |  |
| melt flow rate | [g/10 min] | 31 | 30 | 29 |
| tensile elongation | [%] | 500< | 500< | 500< |
| flexural modulus | [MPa] | 2020 | 1760 | 1930 |
| Izod impact strength (23° C.) | [J/m] | 320 | 300 | 290 |
| Izod impact strength (−30° C.) | [J/m] | 32 | 30 | 28 |
| degree of conspicuousness of flow marks (visual inspection) |  | ○ | ○ | Δ |
| gloss of embossed part (site A) | [%] | 2.5 | 2.6 | 2.9 |
| gloss of embossed part (site B) | [%] | 2.4 | 2.5 | 2.6 |
| plasticization time | [sec] | 12 | 12 | 18 |
| Mw/Mn of CFC (100 to 135° C.) eluate |  | 2.2 | 2.2 | 5.8 |

(Note 1) The contents of propylene/ethylene random copolymer segment in propylene block copolymers (A2-1), (A2-2) and (A2-3) were 7.15 wt %, 7.15 wt % and 7.15 wt %, respectively.
(Note 2) Unit of amount of additive: phr based on the total weight of propylene block copolymer, talc and EBR.

INDUSTRIAL APPLICATION

The present invention enables providing an automobile part (including an injection molded article) which has an excellent balance of rigidity and impact resistance, wherein the probability of flow marks is low and, even if flow marks occur, they are inconspicuous, and which realizes excellent emboss transfer on the surface of molded article and is excellent in appearance.

The polypropylene resin composition for use in the present invention comprises a specified propylene homopolymer (A1) or a specified propylene block copolymer (A2), an elastomer (B) and an inorganic filler (C) in a specified proportion, so that the plasticization time can be shortened to thereby enable shortening the molding cycle for producing an injection molded article. Therefore, the polypropylene resin composition enables efficiently producing an injection molded automobile part exhibiting the above effects.

Consequently, the polypropylene resin composition of the present invention, by virtue of the above characteristics, can find appropriate application in automobile parts, for example, automotive inner trim parts such as a door trim and an instrumental panel, and automotive outer trim parts such as a side protect mole, a bumper, a soft facia and a mud guard.

What is claimed is:

1. An automobile part comprising a polypropylene resin composition, the polypropylene resin composition comprising 30 to 80% by weight of a propylene homopolymer produced in the presence of a metallocene catalyst (A1), 15 to 40% by weight of an elastomer (B) and 5 to 30% by weight of an inorganic filler (C), wherein the propylene homopolymer produced in the presence of a metallocene catalyst (A1) exhibits:
(i) a melt flow rate (measured at 230° C. under a load of 2.16 kg according to ASTM D 1238) of 40 to 200 g/10 min.,
(ii) a proportion of position irregular units derived from 2,1-insertion or 1,3-insertion of propylene monomer relative to all propylene structural units, determined from a $^{13}$C-NMR spectrum, each of 0.05% or less, and
(iii) a molecular weight distribution (Mw/Mn), determined by gel permeation chromatography (GPC), of 1 to 3,
the elastomer (B) is at least one elastomer selected from the group consisting of a propylene/α-olefin random copolymer (B-1) and an ethylene/α-olefin random copolymer (B-2) and has a melt flow rate (measured at 230° C. under a load of 2.16 kg according to ASTM D 1238) of 0.3 to 20 g/10 mm,
and in cross fractionating chromatography (CFC) of the polypropylene resin composition, a 100 to 135° C. eluate with orthodichlorobenzene exhibits a ratio (Mw/Mn) of weight average molecular weight (Mw) to number average molecular weight (Mn) of 1 to 3.

2. The automobile part comprising a polypropylene resin composition as claimed in claim 1, wherein the inorganic filler (C) is talc.

3. The automobile part comprising a polypropylene resin composition as claimed in claim 1, which is an injection molded article that, when reflectances (angle of incidence: 90°, angle of reflection: 90° and area where measuring is performed: 4 mm φ) are measured at intervals of 5 mm in a direction of injection flow over a length of 50 to 150 mm from a flow end, a reflectance difference between neighboring points satisfies the formula:

Δreflectance difference≦0.5.

* * * * *